US008504181B2

(12) United States Patent
Seefeldt et al.

(10) Patent No.: US 8,504,181 B2

(45) Date of Patent: Aug. 6, 2013

(54) AUDIO SIGNAL LOUDNESS MEASUREMENT AND MODIFICATION IN THE MDCT DOMAIN

(75) Inventors: Alan Jeffrey Seefeldt, San Francisco, CA (US); Brett Graham Crockett, San Francisco, CA (US); Michael John Smithers, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 177 days.

(21) Appl. No.: 12/225,976

(22) PCT Filed: Mar. 30, 2007

(86) PCT No.: PCT/US2007/007945

§ 371 (c)(1), (2), (4) Date: Jul. 30, 2009

(87) PCT Pub. No.: WO2007/120452

PCT Pub. Date: Oct. 25, 2007

(65) Prior Publication Data

US 2009/0304190 A1 Dec. 10, 2009

Related U.S. Application Data

(60) Provisional application No. 60/789,526, filed on Apr. 4, 2006.

(51) Int. Cl.
*G06F 17/00* (2006.01)

(52) U.S. Cl.
USPC ........................................................ 700/94

(58) Field of Classification Search
USPC ........................................................ 700/94
See application file for complete search history.

(56) References Cited

U.S. PATENT DOCUMENTS

| | | | |
|---|---|---|---|
| 2,808,475 | A | 10/1957 | Stryker |
| 4,281,218 | A | 7/1981 | Chuang et al. |
| 4,543,537 | A | 9/1985 | Kuhn et al. |
| 4,739,514 | A | 4/1988 | Short et al. |
| 4,887,299 | A | 12/1989 | Cummins et al. |

(Continued)

FOREIGN PATENT DOCUMENTS

| | | |
|---|---|---|
| DE | 43 35 739 | 5/1995 |
| DE | 198 48 491 | 4/2000 |

(Continued)

OTHER PUBLICATIONS

Seefeldt, et al.; "A New Objective Measure of Perceived Loudness," Audio Engineering Society (AES) 117$^{th}$ Convention, Paper 6236, Oct. 28-31, 2004, San Francisco, CA, pp. 1-8.

(Continued)

*Primary Examiner* — Joseph Saunders, Jr.

(57) ABSTRACT

Processing an audio signal represented by the Modified Discrete Cosine Transform (MDCT) of a time-sampled real signal is disclosed in which the loudness of the transformed audio signal is measured, and at least in part in response to the measuring, the loudness of the transformed audio signal is modified. When gain modifying more than one frequency band, the variation or variations in gain from frequency band to frequency band, is smooth. The loudness measurement employs a smoothing time constant commensurate with the integration time of human loudness perception or slower.

7 Claims, 13 Drawing Sheets

U.S. PATENT DOCUMENTS

| | | | | |
|---|---|---|---|---|
| 5,027,410 | A | 6/1991 | Williamson et al. | |
| 5,081,687 | A | 1/1992 | Henley | |
| 5,097,510 | A | 3/1992 | Graupe | |
| 5,172,358 | A | 12/1992 | Kimura | |
| 5,278,912 | A | 1/1994 | Waldhauer | |
| 5,363,147 | A | 11/1994 | Joseph et al. | |
| 5,369,711 | A | 11/1994 | Williamson, III | |
| 5,377,277 | A | 12/1994 | Bisping | |
| RE34,961 | E | 6/1995 | Widin et al. | |
| 5,457,769 | A | 10/1995 | Valley | |
| 5,500,902 | A | 3/1996 | Stockham, Jr. et al. | |
| 5,530,760 | A | 6/1996 | Paisley | |
| 5,548,638 | A | 8/1996 | Yamaguchi et al. | |
| 5,583,962 | A | 12/1996 | Davis et al. | |
| 5,615,270 | A | 3/1997 | Miller et al. | |
| 5,632,005 | A | 5/1997 | Davis et al. | |
| 5,633,981 | A | 5/1997 | Davis | |
| 5,649,060 | A | 7/1997 | Ellozy et al. | |
| 5,663,727 | A | 9/1997 | Vokac | |
| 5,682,463 | A | 10/1997 | Allen | |
| 5,712,954 | A | 1/1998 | Dezonno | |
| 5,724,433 | A | 3/1998 | Engebretson et al. | |
| 5,727,119 | A | 3/1998 | Davidson et al. | |
| 5,819,247 | A | 10/1998 | Freund et al. | |
| 5,848,171 | A | 12/1998 | Stockham, Jr. et al. | |
| 5,862,228 | A | 1/1999 | Davis | |
| 5,872,852 | A * | 2/1999 | Dougherty | 381/57 |
| 5,878,391 | A | 3/1999 | Aarts | |
| 5,907,622 | A | 5/1999 | Dougherty | |
| 5,909,664 | A | 6/1999 | Davis et al. | |
| 5,999,012 | A | 12/1999 | Listwan | |
| 6,002,776 | A | 12/1999 | Bhadkamkar et al. | |
| 6,002,966 | A | 12/1999 | Loeb et al. | |
| 6,021,386 | A | 2/2000 | Davis et al. | |
| 6,041,295 | A | 3/2000 | Hinderks | |
| 6,061,647 | A | 5/2000 | Barrett | |
| 6,088,461 | A | 7/2000 | Lin et al. | |
| 6,094,489 | A | 7/2000 | Ishige et al. | |
| 6,108,431 | A | 8/2000 | Bachler | |
| 6,125,343 | A | 9/2000 | Schuster | |
| 6,148,085 | A | 11/2000 | Jung | |
| 6,182,033 | B1 | 1/2001 | Accardi et al. | |
| 6,185,309 | B1 | 2/2001 | Attias | |
| 6,233,554 | B1 | 5/2001 | Heimbigner et al. | |
| 6,240,388 | B1 | 5/2001 | Fukuchi | |
| 6,263,371 | B1 | 7/2001 | Geagan, III et al. | |
| 6,272,360 | B1 | 8/2001 | Yamaguchi et al. | |
| 6,275,795 | B1 | 8/2001 | Tzirkel-Hancock et al. | |
| 6,298,139 | B1 | 10/2001 | Poulsen et al. | |
| 6,301,555 | B2 | 10/2001 | Hinderks | |
| 6,311,155 | B1 | 10/2001 | Vaudrey et al. | |
| 6,314,396 | B1 | 11/2001 | Monkowski | |
| 6,327,366 | B1 | 12/2001 | Uvacek et al. | |
| 6,332,119 | B1 | 12/2001 | Hinderks | |
| 6,351,731 | B1 | 2/2002 | Anderson et al. | |
| 6,351,733 | B1 | 2/2002 | Saunders et al. | |
| 6,353,671 | B1 | 3/2002 | Kandel et al. | |
| 6,370,255 | B1 | 4/2002 | Schaub et al. | |
| 6,411,927 | B1 | 6/2002 | Morin et al. | |
| 6,430,533 | B1 | 8/2002 | Kolluru et al. | |
| 6,442,278 | B1 | 8/2002 | Vaudrey et al. | |
| 6,442,281 | B2 | 8/2002 | Sato et al. | |
| 6,473,731 | B2 | 10/2002 | Hinderks | |
| 6,498,855 | B1 | 12/2002 | Kokkosoulis et al. | |
| 6,529,605 | B1 | 3/2003 | Christoph | |
| 6,570,991 | B1 | 5/2003 | Scheirer | |
| 6,625,433 | B1 | 9/2003 | Poirier et al. | |
| 6,639,989 | B1 | 10/2003 | Zacharov et al. | |
| 6,650,755 | B2 | 11/2003 | Vaudrey et al. | |
| 6,651,041 | B1 | 11/2003 | Juric | |
| 6,700,982 | B1 | 3/2004 | Geurts et al. | |
| 6,807,525 | B1 | 10/2004 | Li et al. | |
| 6,823,303 | B1 | 11/2004 | Su et al. | |
| 6,889,186 | B1 | 5/2005 | Michaelis | |
| 6,985,594 | B1 | 1/2006 | Vaudrey et al. | |
| 7,065,498 | B1 | 6/2006 | Thomas et al. | |
| 7,068,723 | B2 | 6/2006 | Foote et al. | |
| 7,155,385 | B2 | 12/2006 | Berestesky et al. | |
| 7,171,272 | B2 | 1/2007 | Blarney et al. | |
| 7,212,640 | B2 | 5/2007 | Bizjak | |
| 7,454,331 | B2 | 11/2008 | Vinton et al. | |
| 7,912,226 | B1 * | 3/2011 | James et al. | 381/56 |
| 2001/0027393 | A1 | 10/2001 | Touimi et al. | |
| 2001/0038643 | A1 | 11/2001 | McParland | |
| 2001/0045997 | A1 | 11/2001 | Kim | |
| 2002/0013698 | A1 | 1/2002 | Vaudrey et al. | |
| 2002/0040295 | A1 | 4/2002 | Saunders et al. | |
| 2002/0076072 | A1 | 6/2002 | Cornelisse | |
| 2002/0097882 | A1 | 7/2002 | Greenberg et al. | |
| 2002/0146137 | A1 | 10/2002 | Kuhnel et al. | |
| 2002/0147595 | A1 | 10/2002 | Baumgarte | |
| 2003/0002683 | A1 | 1/2003 | Vaudrey et al. | |
| 2003/0035549 | A1 | 2/2003 | Bizjak et al. | |
| 2004/0024591 | A1 | 2/2004 | Boillot et al. | |
| 2004/0037421 | A1 | 2/2004 | Truman | |
| 2004/0042617 | A1 | 3/2004 | Beerends et al. | |
| 2004/0044525 | A1 | 3/2004 | Vinton et al. | |
| 2004/0076302 | A1 | 4/2004 | Christoph | |
| 2004/0122662 | A1 | 6/2004 | Crockett | |
| 2004/0148159 | A1 | 7/2004 | Crockett et al. | |
| 2004/0165730 | A1 | 8/2004 | Crockett | |
| 2004/0172240 | A1 | 9/2004 | Crockett et al. | |
| 2004/0184537 | A1 | 9/2004 | Geiger et al. | |
| 2004/0190740 | A1 | 9/2004 | Chalupper et al. | |
| 2004/0213420 | A1 | 10/2004 | Gundry | |
| 2005/0018862 | A1 * | 1/2005 | Fisher | 381/98 |
| 2005/0149339 | A1 * | 7/2005 | Tanaka et al. | 704/500 |
| 2006/0002572 | A1 | 1/2006 | Smithers et al. | |
| 2006/0215852 | A1 | 9/2006 | Troxel | |
| 2007/0291959 | A1 | 12/2007 | Seefeldt | |

FOREIGN PATENT DOCUMENTS

| | | |
|---|---|---|
| EP | 0 517 233 | 12/1992 |
| EP | 0 637 011 | 2/1995 |
| EP | 0 661 905 | 5/1995 |
| EP | 0 746 116 | 12/1996 |
| EP | 1 239 269 | 9/2002 |
| EP | 1 251 715 | 10/2002 |
| EP | 1 387 487 | 4/2004 |
| EP | 1 736 966 | 7/2007 |
| FR | 2 820 573 | 8/2002 |
| JP | H08-272399 | 10/1996 |
| JP | 10-207489 | 8/1998 |
| JP | 11-177434 | 7/1999 |
| JP | 2000-347697 | 12/2000 |
| JP | 2004-361573 | 12/2001 |
| JP | 2002-026736 | 1/2002 |
| JP | 2003-264892 | 9/2003 |
| JP | 2004-233570 | 8/2004 |
| JP | 2005-027273 | 1/2005 |
| WO | WO/98/27543 | 6/1998 |
| WO | WO/00/78093 | 12/2000 |
| WO | WO/02/17678 | 2/2002 |
| WO | WO 03/090208 | 10/2003 |
| WO | WO 2004/019656 | 3/2004 |
| WO | WO 2004/073178 | 8/2004 |
| WO | WO 2004/111994 | 12/2004 |
| WO | WO 2005/086139 | 9/2005 |
| WO | WO 2005/104360 | 11/2005 |
| WO | WO 2006/006977 | 1/2006 |
| WO | WO 2006/019719 | 2/2006 |
| WO | WO 2006/047600 | 5/2006 |
| WO | WO 2006/113047 | 10/2006 |
| WO | WO/2007/120452 | 10/2007 |
| WO | WO/2007/120453 | 10/2007 |
| WO | WO 2007/123608 | 11/2007 |
| WO | WO/2007/127023 | 11/2007 |
| WO | WO 2008/051347 | 5/2008 |
| WO | WO 2008/057173 | 5/2008 |
| WO | WO/2008/085330 | 7/2008 |
| WO | WO 2008/115445 | 9/2008 |
| WO | WO 2008/156774 | 12/2008 |

OTHER PUBLICATIONS

Chalupper, Josef; "Aural Exciter and Loudness Maximizer: What's Psychoacoustic about Psychoacoustic Processors?," Audio Engineering Society (AES) $108^{th}$ Convention, Sep. 22-25, 2000, Los Angeles, CA, pp. 1-20.
Ghent, Jr., et al.; "Expansion as a Sound Processing Tool in Hearing Aids," American Academy of Audiology National Convention, Apr. 29-May 2, 1999, Miami Beach, FL.
Ghent, Jr., et al.; "Uses of Expansion to Promote Listening Comfort with Hearing Aids," American Academy of Audiology $12^{th}$ Annual Convention, Mar. 16-19, 2000, Chicago, IL.
Martinez G., Isaac; "Automatic Gain Control (AGC) Circuits—Theory and Design," University of Toronto ECE1352 Analog Integrated Circuits I, Term Paper, Fall 2001, pp. 1-25.
Park, et al.; "High Performance Digital Hearing Aid Processor with Psychoacoustic Loudness Correction," IEEE FAM P3.1 0-7803-3734-4/97, pp. 312-313.
Bray, et al.; "Optimized Target Matching: Demonstration of an Adaptive Nonlinear DSP System," Sonic Innovations vol. 1 No. 2 1998, pp. 1-4, presented at the American Academy of Audiology, Los Angeles, CA, Apr. 4, 1998.
Bray, et al.; "An "Optimized" Platform for DSP Hearing Aids," Sonic Innovations, vol. 1 No. 3 1998, pp. 1-4, presented at the Conference on Advanced Signal Processing Hearing Aids, Cleveland, OH, Aug. 1, 1998.
Bray, et al.; "Digital Signal Processing (DSP) Derived from a Nonlinear Auditory Model," Sonic Innovations, vol. 1 No. 1 1998, pp. 1-3, presented at American Academy of Audiology, Los Angeles, CA, Apr. 4, 1998.
Ghent, Jr., et al.; "Uses of Expansion to Promote Listening Comfort with Hearing Aids," Sonic Innovations, vol. 3 No. 2, 2000, pp. 1-4, presented at American Academy of Audiology $12^{th}$ Annual Convention, Chicago, IL, Mar. 16-19, 2000.
Nilsson, et al.; "The Evolution of Multi-channel Compression Hearing Aids," Sonic Innovations, Presented at American Academy of Audiology $13^{th}$ Convention, San Diego, CA, Apr. 19-22, 2001.
Johns, et al.; "An Advanced Graphic Equalizer Hearing Aid: Going Beyond Your Home Audio System," Sonic Innovations Corporation, Mar. 5, 2001, Http://www.audiologyonline.com/articles/pf_arc_disp.asp?id=279.
Smith, et al., "Tandem-Free VolP Conferencing: A Bridge to Next-Generation Networks," IEEE Communications Magazine, IEEE Service Center, New York, NY, vol. 41, No. 5, May 2003, pp. 136-145.
H. H. Scott, "The Amplifier and Its Place in the High Fidelity System," J. Audio Eng. Soc., vol. 1, No. 3, Jul. 1953.
Nigro, et al., "Concert-Hall Realism through the Use of Dynamic Level Control," J. Audio Eng. Soc., vol. 1, No. 1, Jan. 1953.
Newcomb, et al., "Practical Loudness: an Active Circuit Design Approach," J. Audio eng. Soc., vol. 24, No. 1, Jan./Feb. 1976.
Robinson, et a., Dynamic Range Control via Metadata, $107^{th}$ Convention of the AES, Sep. 14-27, 1999, New York.
Watson, et al., "Signal Duration and Signal Frequency in Relation to Auditory Sensitivity," Journal of the Acoustical Society of America, vol. 46, No. 4 (Part 2) 1969, pp. 989-997.
ATSC Standard A52/A: Digital Audio Compression Standard (AC-3), Revision A, Advanced Television Systems Committee, Aug. 20, 2001. The A/52A document is available on the World Wide Web at http://www./atsc.org. standards.html.
Todd, et al., "Flexible Perceptual Coding for Audio Transmission and Storage," $96^{th}$ Convention of the Audio Engineering Society, Feb. 26, 1994, Preprint, 3796.
Davis, Mark, "The AC-3 Multichannel Coder," Audio engineering Society, Preprint 3774, $95^{th}$ AES Convention, Oct. 1993.
Bosi, et al., "High Quality, Low-Rate Audio Transform Coding for Transmission and Multimedia Applications," Audio Engineering Society Preprint 3365, $93^{rd}$ AES Convention, Oct. 1992.
Fielder, et al., "Introduction to Dolby Digital Plus, an Enhancement to the Dolby Digital Coding System," AES Convention Paper 6196, $117^{th}$ AES Convention, Oct. 28, 2004.
Truman, et al., "Efficient Bit Allocation, Quantization, and Coding in an Audio Distribution System," AES Preprint 5068, $107^{th}$ AES Conference, Aug. 1999.
Fielder, et al., "Professional Audio Coder Optimized fro Use with Video," AES Preprint 5033, $107^{th}$ AES Conference, Aug. 1999.
Brandenburg, et al., "Overview of MPEG Audio: Current and Future Standards for Low-Bit-Rate Audio Coding," J. Audio eng. Soc., vol. 45, No. 1/2, Jan./Feb. 1997.
Vernon, Steve, "Design and Implementation of AC-3 Coders," IEEE Trans. Consumer Electronics, vol. 41, No. 3, Aug. 1995.
Crockett, et al., "A Method for Characterizing and Identifying Audio Based on Auditory Scene Analysis," Audio Engineering Society Convention Paper 6416, $118^{th}$ Convention, Barcelona, May 28-31, 2005.
Crockett, Brett, "High Quality Multichannel Time Scaling and Pitch-Shifting using Auditory Scene Analysis," Audio Engineering Society Convention Paper 5948, New York, Oct. 2003.
Hauenstein M., "A Computationally Efficient Algorithm for Calculating Loudness Patterns of Narrowband Speech," Acoustics, Speech and Signal Processing 1997. 1997 IEEE International Conference, Munich Germany, Apr. 21-24, 1997, Los Alamitos, CA, USA, IEEE Comput. Soc., US, Apr. 21, 1997, pp. 1311-1314.
Cheng-Chieh Lee, "Diversity Control Among Multiple Coders: A Simple Approach to Multiple Descriptions," IEE, Sep. 2000.
Moore, et al., "A Model for the Prediction of Thresholds, Loudness and Partial Loudness," Journal of the Audio Engineering Society, Audio Engineering Society, New York, vol. 45, No. 4, Apr. 1997, pp. 224-240.
Glasberg, et al., "A Model of Loudness Applicable to Time-Varying Sounds," Journal of the Audio Engineering Society, Audio Engineering Society, New York, vol. 50, No. 5, May 2002, pp. 331-342.
Stevens, "Calculations of the Loudness of Complex Noise," Journal of the Acoustical Society of America, 1956.
Zwicker, "Psychological and Methodical Basis of Loudness," Acoustica, 1958.
Australian Broadcasting Authority (ABA), "Investigation into Loudness of Advertisements," Jul. 2002.
Zwicker, et al., "Psychoacoustics—Facts and Models," Springer-Verlag, Chapter 8, "Loudness," pp. 203-238, Berlin Heidelberg, 1990, 1999.
Lin, L., et al., "Auditory Filter Bank Design Using Masking Curves," $7^{th}$ European Conference on Speech Communications and Technology, Sep. 2001.
ISO226 : 1987 (E), "Acoustics—Normal Equal Loudness Level Contours."
Moulton, Dave, "Loud, Louder, Loudest!," Electronic Musician, Aug. 1, 2003.
Riedmiller, Jeff, "Working Toward Consistency in Program Loudness," Broadcast Engineering, Jan. 1, 2004.
Robinson, et al., "Time-Domain Auditory Model for the Assessment of High-Quality Coded Audio," $107^{th}$ AES Convention, Sep. 1999.
Hermesand, et al., "Sound Design—Creating the Sound for Complex Systems and Virtual Objects," Chapter II, "Anatomy and Psychoacoustics," 2003-2004.
Notification of Transmittal of the International Search Report, PCT/US2006/011202, dated Aug. 9, 2006.
Written Opinion of the International Search Authority, PCT/US2006/011202, dated Aug. 9, 2006.
Carroll, Tim, "Audio Metadata: You can get there from here", Oct. 11, 2004, pp. 1-4, XP002392570. http://tvtechnology.com/features/audio_notes/f-TC-metadata-08.21.02.shtml.
Trapee, W., et al., "Key distribution for secure multimedia multicasts via data embedding," 2001 IEEE International Conferenced on Acoustics, Speech, and Signal Processing. May 7-11, 2001.
Bertsekas, Dimitri P., "Nonlinear Programming," 1995, Chapter 1.2 "Gradient Methods—Convergence," pp. 18-46.
Bertsekas, Dimitri P., "Nonlinear Programming," 1995, Chapter 1.8 "Nonderivative Methods,", pp. 142-148.
Moore, BCJ, "Use of a loudness model for hearing aid fitting, IV. Fitting hearing aids with multi-channel compression so as to restore "normal" loudness for speech at different levels." British Journal of Audiology, vol. 34, No. 3, pp. 165-177, Jun. 2000, Whurr Publishers, UK.
Saunders, "Real-Time Discrimination of Broadcast Speech/Music," Proc. of Int: Conf. on Acoust. Speech and Sig. Proce., 1996, pp. 993-996.
Bosi, et al., "ISO/IEC MPEG-2 Advanced Audio coding," J. Audio Eng. Soc., vol. 45, No. 10, Oct. 1997, pp. 789-814.

Scheirer and Slaney, "Construction and Evaluation of a robust Multifeature Speech/Music Discriminator," Proc. of Int. Conf. on Acoust. Speech and Sig. Proc., 1997, pp. 1331-1334.
Schapire, "A Brief Introduction to Boosting," Proc. of the 16$^{th}$ Int. Joint Conference on Artificial Intelligence, 1999.
Guide to the Use of the ATSC Digital Television Standard, Dec. 4, 2003.
ISO Standard 532:1975, published 1975.
Belger, "The Loudness Balance of Audio Broadcast Programs," J. Audio Eng. Soc., vol. 17, No. 3, Jun. 1969, pp. 282-285.
Atkinson, I. A., et al., "Time Envelope LP Vocoder: A New Coding Technology at Very Low Bit Rates," 4$^{th}$ ed., 1995, ISSN 1018-4074, pp. 241-244.
Mapes, Riordan, et al., "Towards a model of Loudness Recalibration," 1997 IEEE ASSP workshop on New Paltz, NY USA, Oct. 19-22, 1997.
CEI/IEC Standard 60804 published Oct. 2000.
Blesser, Barry, "An Ultraminiature console Compression System with Maximum User Flexibility," Journal of Audio Engineering Society, vol. 20, No. 4, May 1972, pp. 297-302.
Hoeg, W., et al., "Dynamic Range Control (DRC) and Music/Speech Control (MSC) Programme-Associated Data Services for DAB", EBU Review-Technical, European Broadcasting Union, Brussels, BE, No. 261, Sep. 21, 1994.
Soulodre, GA, "Evaluation of Objective Loudness Meters" Preprints of Papers Presented at the 116$^{th}$ AES Convention, Berlin, Germany, May 8, 2004.
Notification of Transmittal of the International Search Report, PCT/US2007/08313), dated Sep. 21, 2007.
The Written Opinion of the International Searching Authority, PCT/US2007/08313), dated Sep. 21, 2007.
Notification of Transmittal of the International Search Report, PCT/US2007/007946, dated Aug. 21, 2007.
The Written Opinion of the International Searching Authority, PCT/US2007/007946, dated Aug. 21, 2007.
Notification of Transmittal of the International Search Report, PCT/US2007/007945, dated Aug. 17, 2007.
The Written Opinion of the International Searching Authority, PCT/US2007/007945, dated Aug. 17, 2007.
Notification of Transmittal of the International Search Report, PCT/US2007/0025747, dated Apr. 14, 2008.
The Written Opinion of the International Searching Authority, PCT/US2007/0025747, dated Apr. 14, 2008.
International Search Report, PCT/US2004/016964 dated Dec. 1, 2005.
Written Opinion of the International Searching Authority, PCT/US2004/016964 dated Dec. 1, 2005.
International Search Report, PCT/US2006/010823 dated Jul. 25, 2006.
Written Opinion of the International Searching Authority, PCT/US2006/010823 dated Jul. 25, 2006.
International Search Report, PCT/US2005/038579 dated Feb. 21, 2006.
Written Opinion of the International Searching Authority, PCT/US2005/038579 dated Feb. 21, 2006.
International Search Report, PCT/US2007/022132 dated Apr. 18, 2008.
Written Opinion of the International Searching Authority, PCT/US2007/022132 dated Apr. 18, 2008.
International Search Report, PCT/US2007/006444 dated Aug. 28, 2007.
Written Opinion of the International Searching Authority, PCT/US2007/006444 dated Aug. 28, 2007.
Notification of Transmittal of the International Search Report, PCT/US2008/007570, dated Sep. 10, 2008.
The Written Opinion of the International Searching Authority, PCT/US2008/007570, dated Sep. 10, 2008.
International Search Report, PCT/US2007/020747, dated May 21, 2008.
Mexican Patent Application No. PA/a/2005/002290—Response to Office Action dated Oct. 5, 2007.
Communication Under Rule 51(4) EPC, European Patent Office, EP Application No. 03791682.2-2218, dated Dec. 5, 2005.
Notification of the First Office Action, Chinese Application No. 03819918.1, dated Mar. 30, 2007.
Response to Notification of the First Office Action, Chinese Application No. 03819918.1, dated Aug. 14, 2007.
Response Office Action from the Israel Patent Office, Israel Patent Application No. 165,398, dated Dec. 29, 2008.
Official Letter from the Intellectual Property Bureau, Ministry of Economic Affairs, Taiwan, dated Mar. 21, 2008.
Response to Official Letter from the Intellectual Property Bureau, Ministry of Economic Affairs, Taiwan, dated Jun. 25, 2008.
Written Opinion of the Intellectual Property Office of Singapore, Singapore Application No. 0702926-7, dated May 12, 2008.
European Patent Office, Office Action dated Apr. 2, 2008, EP Application No. 05818505.9.
European Patent Office, Response to Office Action dated Apr. 2, 2008, EP Application No. 05818505.9.
Australian Government IP Australia, Examiner's first report on patent application No. 2005299410, mailed Jun. 25, 2009, Australian Patent Appln. No. 2005299410.
Israel Patent Office, Examiner's Report on Israel Application No. 182097 mailed Apr. 11, 2010, Israel Patent Appln. No. 182097.
Intellectual Property Corporation of Malaysia, Substantive/Modified Substantive Examination Adverse Report (Section 30(1)/30(2)) and Search Report, dated Dec. 5, 2008, Malaysian Patent Appln. No. Pl 20055232.
Dept of Justice & Human Rights of Republic of Indonesia, Directorate General Intellectual Property Rights, First Office Action, Indonesian Patent Appln. No. WO0200701285.
State Intellectual Property Office of the People's Republic of China, Notification of the Third Office Action, mailed Apr. 21, 2010, China Patent Appln. No. 200580036760.7.
European Patent Office Searching Authority, Int'l Search Report and Written Opinion, Int'l Appln. No. PCT/US2004/016964, mailed Jun. 20, 2005.
Claro Digital Perception Processing instroduced by Phonak in 2000. (For this reference, the date of publication is sufficiently earlier than the effective US filing date and any foreign priority dates).
Masciale, John M., "The Difficulties in Evaluating A-Weighted Sound Level Measurements" Sound and Vibration Apr. 2002.

* cited by examiner

AUDIO SIGNAL LOUDNESS MEASUREMENT AND MODIFICATION IN THE MDCT DOMAIN

TECHNICAL FIELD

The invention relates to audio signal processing. In particular, the invention relates to the measurement of the loudness of audio signals and to the modification of the loudness of audio signals in the MDCT domain. The invention includes not only methods but also corresponding computer programs and apparatus.

REFERENCES AND INCORPORATION BY REFERENCE

"Dolby Digital" ("Dolby" and "Dolby Digital" are trademarks of Dolby Laboratories Licensing Corporation) referred to herein, also known as "AC-3" is described in various publications including "Digital Audio Compression Standard (AC-3)," Doc. A/52A, Advanced Television Systems Committee, 20 Aug. 2001, available on the Internet at www.atsc.org.

Certain techniques for measuring and adjusting perceived (psychoacoustic loudness) useful in better understanding aspects the present invention are described in published International patent application WO 2004/111994 A2, of Alan Jeffrey Seefeldt et al, published Dec. 23, 2004, entitled "Method, Apparatus and Computer Program for Calculating and Adjusting the Perceived Loudness of an Audio Signal" and in "A New Objective Measure of Perceived Loudness" by Alan Seefeldt et al, Audio Engineering Society Convention Paper 6236, San Francisco, Oct. 28, 2004. Said WO 2004/111994 A2 application and said paper are hereby incorporated by reference in their entirety.

Certain other techniques for measuring and adjusting perceived (psychoacoustic loudness) useful in better understanding aspects the present invention are described in an international application under the Patent Cooperation Treaty Ser. No. PCT/US2005/038579, filed Oct. 25, 2005, published as International Publication Number WO 2006/047600, entitled "Calculating and Adjusting the Perceived Loudness and/or the Perceived Spectral Balance of an Audio Signal" by Alan Jeffrey Seefeldt Said application is hereby incorporated by reference in its entirety.

BACKGROUND ART

Figure 1:
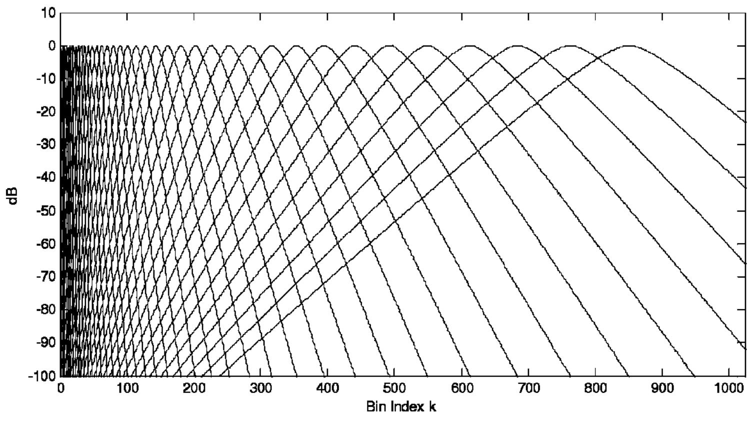
FIG. 1 shows a plot of the responses of critical band filters $C_b[k]$ in which 40 bands are spaced uniformly along the Equivalent Rectangular Bandwidth (ERB) scale.

Many methods exist for objectively measuring the perceived loudness of audio signals. Examples of methods include A, B and C weighted power measures as well as psychoacoustic models of loudness such as "Acoustics—Method for calculating loudness level," ISO 532 (1975). Weighted power measures operate by taking the input audio signal, applying a known filter that emphasizes more perceptibly sensitive frequencies while deemphasizing less perceptibly sensitive frequencies, and then averaging the power of the filtered signal over a predetermined length of time. Psychoacoustic methods are typically more complex and aim to better model the workings of the human ear. They divide the signal into frequency bands that mimic the frequency response and sensitivity of the ear, and then manipulate and integrate these bands taking into account psychoacoustic phenomenon such as frequency and temporal masking, as well as the non-linear perception of loudness with varying signal intensity. The goal of all methods is to derive a numerical measurement that closely matches the subjective impression of the audio signal.

Many loudness measurement methods, especially the psychoacoustic methods, perform a spectral analysis of the audio signal. That is, the audio signal is converted from a time domain representation to a frequency domain representation. This is commonly and most efficiently performed using the Discrete Fourier Transform (DFT), usually implemented as a Fast Fourier Transform (FFT), whose properties, uses and limitations are well understood. The reverse of the Discrete Fourier Transform is called the Inverse Discrete Fourier Transform (IDFT), usually implemented as an Inverse Fast Fourier Transform (IFFT).

Another time-to-frequency transform, similar to the Fourier Transform, is the Discrete Cosine Transform (DCT), usually used as a Modified Discrete Cosine Transform (MDCT). This transform provides a more compact spectral representation of a signal and is widely used in low-bit rate audio coding or compression systems such as Dolby Digital and MPEG2-AAC, as well as image compression systems such as MPEG2 video and JPEG. In audio compression algorithms, the audio signal is separated into overlapping temporal segments and the MDCT transform of each segment is quantized and packed into a bitstream during encoding. During decoding, the segments are each unpacked, and passed through an inverse MDCT (IMDCT) transform to recreate the time domain signal. Similarly, in image compression algorithms, an image is separated into spatial segments and, for each segment, the quantized DCT is packed into a bitstream.

Properties of the MDCT (and similarly the DCT) lead to difficulties when using this transform when performing spectral analysis and modification. First, unlike the DFT that contains both sine and cosine quadrature components, the MDCT contains only the cosine component. When successive and overlapping MDCT's are used to analyze a substantially steady state signal, successive MDCT values fluctuate and thus do not accurately represent the steady state nature of the signal. Second, the MDCT contains temporal aliasing that does not completely cancel if successive MDCT spectral values are substantially modified. More details are provided in the following section.

Because of difficulties processing MDCT domain signals directly, the MDCT signal is typically converted back to the time domain where processing can be performed using FFT's and IFFT's or by direct time domain methods. In the case of frequency domain processing, additional forward and inverse FFTs impose a significant increase in computational complexity and it would be beneficial to dispense with these computations and process the MDCT spectrum directly. For example, when decoding an MDCT-based audio signal such as Dolby Digital, it would be beneficial to perform loudness measurement and spectral modification to adjust the loudness directly on the MDCT spectral values, prior to the inverse MDCT and without requiring the need for FFT's and IFFT's.

Many useful objective measurements of loudness may be computed from the power spectrum of a signal, which is easily estimated from the DFT. It will be demonstrated that a suitable estimate of the power spectrum may also be computed from the MDCT. The accuracy of the estimate generated from the MDCT is a function of the smoothing time constant utilized, and it will be shown that the use of smoothing time constants commensurate with the integration time of human loudness perception produces an estimate that is sufficiently accurate for most loudness measurement applications. In addition to measurement, one may wish to modify the loudness of an audio signal by applying a filter in the MDCT domain. In general, such filtering introduces artifacts to the processed audio, but it will be shown that if the filter varies smoothly across frequency, then the artifacts become perceptually negligible. The types of filtering associated with the proposed loudness modification are constrained to be smooth across frequency and may therefore be applied in the MDCT domain.

Properties of the MDCT

The Discrete Time Fourier Transform (DTFT) at radian frequency ω of a complex signal x of length N is given by:

$$X_{DTFT}(\omega) = \sum_{n=0}^{N-1} x[n]e^{-j\omega n} \tag{1}$$

In practice, the DTFT is sampled at N uniformly spaced frequencies between 0 and 2π. This sampled transform is known as the Discrete Fourier Transform (DFT), and its use is widespread due to the existence of a fast algorithm, the Fast Fourier Transform (FFT), for its calculation. More specifically, the DFT at bin k is given by:

$$X_{DFT}[k] = X_{DTFT}(2\pi k/N) = \sum_{n=0}^{N-1} x[n]e^{-j\frac{2\pi kn}{N}} \tag{2}$$

The DTFT may also be sampled with an offset of one half bin to yield the Shifted Discrete Fourier Transform (SDFT):

$$X_{SDFT}[k] = X_{DTFT}(2\pi(k+1/2)/N) = \sum_{n=0}^{N-1} x[n]e^{-j\frac{2\pi(k+1/2)n}{N}} \tag{3}$$

The inverse DFT (IDFT) is given by $$x_{IDFT}[n] = \sum_{k=0}^{N-1} X_{DFT}[k]e^{j\frac{2\pi kn}{N}} \tag{4}$$

and the inverse SDFT (ISDFT) is given by $$x_{ISDFT}[n] = \sum_{k=0}^{N-1} X_{SDFT}[k]e^{j\frac{2\pi(k+1/2)n}{N}} \tag{5}$$

Both the DFT and SDFT are perfectly invertible such that $x[n]=x_{IDFT}[n]=x_{ISDFT}[n]$.

The N point Modified Discrete Cosine Transform (MDCT) of a real signal x is given by:

$$X_{MDCT}[k]=\sum_{n=0}^{N-1}x[n]\cos((2\pi/N)(k+1/2)(n+n_0)), \tag{6}$$

where $$n_0=\frac{(N/2)+1}{2}$$

The N point MDCT is actually redundant, with only N/2 unique points. It can be shown that:

$$X_{MDCT}[k]=-x_{MDCT}[N-k-1] \tag{7}$$

The inverse MDCT (IMDCT) is given by $$x_{IMDCT}[n]=\sum_{n=0}^{N-1}X_{MDCT}[k]\cos((2\pi/N)(k+1/2)(n+n_0)) \tag{8}$$

Unlike the DFT and SDFT, the MDCT is not perfectly invertible: $x_{IMDCT}[n]\neq x[n]$. Instead $x_{IMDCT}[n]$ is a time-aliased version of x[n]:

$$x_{IMDCT}[n]=\begin{cases}x[n]-x[N/2-1-n] & 0\le n<N/2\\ x[n]+x[3N/2-1-n] & N/2\le n<N\end{cases} \tag{9}$$

After manipulation of (6), a relation between the MDCT and the SDFT of a real signal x may be formulated:

$$X_{MDCT}[k]=|X_{SDFT}[k]|\cos\left(\angle X_{SDFT}[k]-\frac{2\pi}{N}n_0(k+1/2)\right) \tag{10}$$

In other words, the MDCT may be expressed as the magnitude of the SDFT modulated by a cosine that is a function of the angle of the SDFT.

In many audio processing applications, it is useful to compute the DFT of consecutive overlapping, windowed blocks of an audio signal x. One refers to this overlapped transform as the Short-time Discrete Fourier Transform (STDFT). Assuming that the signal x is much longer than the transform length N, the STDFT at bin k and block t is given by:

$$X_{DFT}[k,t]=\sum_{n=0}^{N-1}w_A[n]x[n+Mt]e^{-j\frac{2\pi k}{N}n} \tag{11}$$

where $w_A[n]$ is the analysis window of length N and M is the block hopsize. A Short-time Shifted Discrete Fourier Transform (STSDFT) and Short-time Modified Discrete Cosine Transform (STMDCT) may be defined analogously to the STDFT. One refers to these transforms as $X_{SDFT}[k,t]$ and $X_{MDCT}[k,t]$, respectively. Because the DFT and SDFT are both perfectly invertible, the STDFT and STSDFT may be perfectly inverted by inverting each block and then overlapping and adding, given that the window and hopsize are chosen appropriately. Even though the MDCT is not invertible, the STMDCT may be made perfectly invertible with M=N/2 and an appropriate window choice, such as a sine window. Under such conditions, the aliasing given in Eqn. (9) between consecutive inverted blocks cancels out exactly when the inverted blocks are overlap added. This property, along with the fact that the N point MDCT contains N/2 unique points, makes the STMDCT a perfect reconstruction, critically sampled filterbank with overlap. By comparison, the STDFT and STSDFT are both over-sampled by a factor of two for the same hopsize. As a result, the STMDCT has become the most commonly used transform for perceptual audio coding.

DISCLOSURE OF THE INVENTION

Power Spectrum Estimation

One common use of the STDFT and STSDFT is to estimate the power spectrum of a signal by averaging the squared magnitude of $X_{DFT}[k,t]$ or $X_{SDFT}[k,t]$ over many blocks t. A moving average of length T blocks may be computed to produce a time-varying estimate of the power spectrum as follows:

$$P_{DFT}[k,t]=\frac{1}{T}\sum_{\tau=0}^{T-1}|X_{DFT}[k,t-\tau]|^2 \tag{12a}$$

$$P_{SDFT}[k,t]=\frac{1}{T}\sum_{\tau=0}^{T-1}|X_{SDFT}[k,t-\tau]|^2 \tag{12b}$$

These power spectrum estimates are particularly useful for computing various objective loudness measures of a signal, as is discussed below. It will now be shown that $P_{SDFT}[k,t]$ may be approximated from $X_{MDCT}[k,t]$ under certain assumptions. First, define:

$$P_{MDCT}[k,t]=\frac{1}{T}\sum_{\tau=0}^{T-1}|X_{MDCT}[k,t-\tau]|^2 \tag{13a}$$

Using the relation in (10), one then has:

$$P_{MDCT}[k,t]=\frac{1}{T}\sum_{\tau=0}^{T-1}|X_{SDFT}[k,t-\tau]|^2\cos^2\left(\angle X_{SDFT}[k,t-\tau]-\frac{2\pi}{N}n_0(k+1/2)\right) \tag{13b}$$

If one assumes that $|X_{SDFT}[k,t]|$ and $\angle X_{SDFT}[k,t]$ co-vary relatively independently across blocks t, an assumption that holds true for most audio signals, one can write:

$$P_{MDCT}[k,t]\cong\left(\frac{1}{T}\sum_{\tau=0}^{T-1}|X_{SDFT}[k,t-\tau]|^2\right)\left(\frac{1}{T}\sum_{\tau=0}^{T-1}\cos^2\left(\angle X_{SDFT}[k,t-\tau]-\frac{2\pi}{N}n_0(k+1/2)\right)\right) \tag{13d}$$

If one further assumes that $\angle X_{SDFT}[k,t]$ is distributed uniformly between 0 and $2\pi$ over the T blocks in the sum, another assumption that generally holds true for audio, and if T is relatively large, then one may write $$P_{MDCT}[k,t] \cong \frac{1}{2}\left(\frac{1}{T}\sum_{\tau=0}^{T-1}|X_{SDFT}[k,t-\tau]|^2\right) = \frac{1}{2}P_{SDFT}[k,t] \quad (13e)$$

because the expected value of cosine squared with a uniformly distributed phase angle is one half. Thus, one may see that the power spectrum estimated from the STMDCT is equal to approximately half of that estimated from the STSDFT.

Rather than estimating the power spectrum using a moving average, one may alternatively employ a single-pole smoothing filter as follows:

$$P_{DFT}[k,t]=\lambda P_{DFT}[k,t-1]+(1-\lambda)|X_{DFT}[k,t]|^2 \quad (14a)$$

$$P_{SDFT}[k,t]=\lambda P_{SDFT}[k,t-1]+(1-\lambda)|X_{SDFT}[k,t]|^2 \quad (14b)$$

$$P_{MDCT}[k,t]=\lambda P_{MDCT}[k,t-1]+(1-\lambda)|X_{MDCT}[k,t]|^2 \quad (14c)$$

where the half decay time of the smoothing filter measured in units of transform blocks is given by $$T = \frac{\log(1/e)}{\log(\lambda)} \quad (14d)$$

In this case, it can be similarly shown that $P_{MDCT}[k,t] \cong (1/2) P_{SDFT}[k,t]$ if T is relatively large.

For practical applications, one determines how large T should be in either the moving average or single pole case to obtain a sufficiently accurate estimate of the power spectrum from the MDCT. To do this, one may look at the error between $P_{SDFT}[k,t]$ and $2P_{MDCT}[k,t]$ for a given value of T. For applications involving perceptually based measurements and modifications, such as loudness, examining this error at every individual transform bin k is not particularly useful. Instead it makes more sense to examine the error within critical bands, which mimic the response of the ear's basilar membrane at a particular location. In order to do this one may compute a critical band power spectrum by multiplying the power spectrum with critical band filters and then integrating across frequency:

$$P_{SDFT}^{CB}[b,t] = \sum_k |C_b[k]|^2 P_{SDFT}[k,t] \quad (15a)$$

$$P_{MDCT}^{CB}[b,t] = \sum_k |C_b[k]|^2 P_{MDCT}[k,t] \quad (15b)$$

Here $C_b[k]$ represents the response of the filter for critical band b sampled at the frequency corresponding to transform bin k. FIG. 1 shows a plot of critical band filter responses in which 40 bands are spaced uniformly along the Equivalent Rectangular Bandwidth (ERB) scale, as defined by Moore and Glasberg (B. C. J. Moore, B. Glasberg, T. Baer, "A Model for the Prediction of Thresholds, Loudness, and Partial Loudness," *Journal of the Audio Engineering Society*, Vol. 45, No. 4, April 1997, pp. 224-240). Each filter shape is described by a rounded exponential function, as suggested by Moore and Glasberg, and the bands are distributed using a spacing of ERB.

Figure 2A:
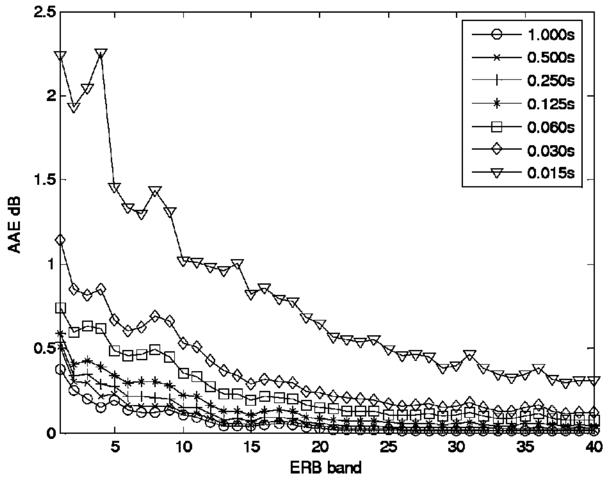
FIG. 2*a* shows plots of Average Absolute Error (AAE) in dB between $P_{SDFT}^{CB}[b,t]$ and $2P_{MDCT}^{CB}[k,t]$ computed using a moving average for various values of T.

One may now examine the error between $P_{SDFT}^{CB}[b,t]$ and $2P_{MDCT}^{CB}[k,t]$ for various values of T for both the moving average and single pole techniques of computing the power spectrum. FIG. 2*a* depicts this error for the moving average case. Specifically, the average absolute error (AAE) in dB for each of the 40 critical bands for a 10 second musical segment is depicted for a variety of averaging window lengths T. The audio was sampled at a rate of 44100 Hz, the transform size was set to 1024 samples, and the hopsize was set at 512 samples. The plot shows the values of T ranging from 1 second down to 15 milliseconds. One notes that for every band, the error decreases as T increases, which is expected; the accuracy of the MDCT power spectrum depends on T being relatively large. Also, for every value of T, the error tends to decrease with increasing critical band number. This may be attributed to the fact that the critical bands become wider with increasing center frequency. As a result, more bins k are grouped together to estimate the power in the band, thereby averaging out the error from individual bins. As a reference point, one notes that an AAE of less that 0.5 dB may be obtained in every band with a moving average window length of 250 ms or more. A difference of 0.5 dB is roughly equal to the threshold below which a human is unable to reliably discriminate level differences.

Figure 2B:
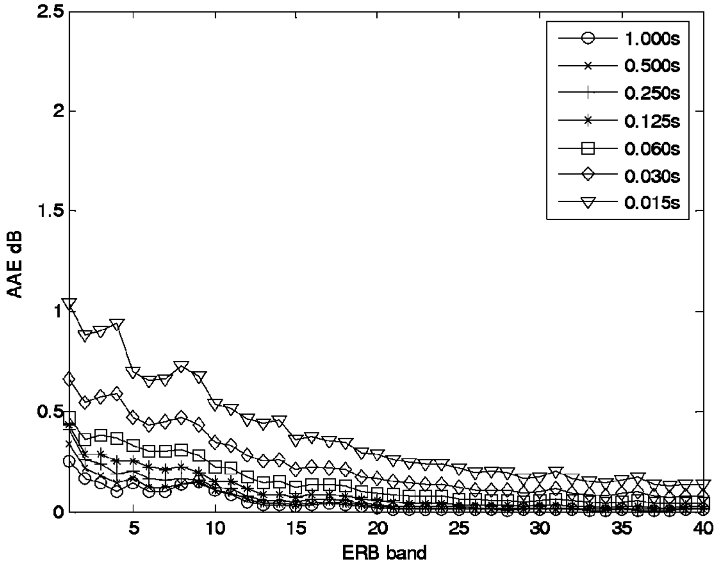
FIG. 2*b* shows plots of Average Absolute Error (AAE) in dB between $P_{SDFT}^{CB}[b,t]$ and $2P_{MDCT}^{CB}[k,t]$ computed using a one pole smoother with various values of T.

FIG. 2*b* shows the same plot, but for $P_{SDFT}^{CB}[b,t]$ and $2P_{MDCT}^{CB}[k,t]$ computed using a one pole smoother. The same trends in the AAE are seen as those in the moving average case, but with the errors here being uniformly smaller. This is because the averaging window associated with the one pole smoother is infinite with an exponential decay. One notes that an AAE of less than 0.5 dB in every band may be obtained with a decay time T of 60 ms or more.

For applications involving loudness measurement and modification, the time constants utilized for computing the power spectrum estimate need not be any faster than the human integration time of loudness perception. Watson and Gengel performed experiments demonstrating that this integration time decreased with increasing frequency; it is within the range of 150-175 ms at low frequencies (125-200 Hz or 4-6 ERB) and 40-60 ms at high frequencies (3000-4000 Hz or 25-27 ERB) (Charles S. Watson and Roy W. Gengel, "Signal Duration and Signal Frequency in Relation to Auditory Sensitivity" *Journal of the Acoustical Society of America*, Vol. 46, No. 4 (Part 2), 1969, pp. 989-997). One may therefore advantageously compute a power spectrum estimate in which the smoothing time constants vary accordingly with frequency. Examination of FIG. 2*b* indicates that such frequency varying time constants may be utilized to generate power spectrum estimates from the MDCT that exhibit a small average error (less that 0.25 dB) within each critical band.

Filtering

Another common use of the STDFT is to efficiently perform time-varying filtering of an audio signal. This is achieved by multiplying each block of the STDFT with the frequency response of the desired filter to yield a filtered STDFT:

$$Y_{DFT}[k,t]=H[k,t]X_{DFT}[k,t] \quad (16)$$

The windowed IDFT of each block of $Y_{DFT}[k,t]$ is equal to the corresponding windowed segment of the signal x circularly convolved with the IDFT of H[k,t] and multiplied with a synthesis window $w_S[n]$:

$$y_{IDFT}[n,t] = w_S[n]\sum_{m=0}^{N-1} h_{IDFT}[((n-m))_N, t]\, w_A[n]\, x[n+Mt], \tag{17}$$

where the operator $((*))_N$ indicates modulo-N. A filtered time domain signal, y, is then produced through overlap-add synthesis of $y_{IDFT}[n,t]$. If $h_{IDFT}[n,t]$ in (15) is zero for n>P, where P<N, and $w_A[n]$ is zero for n>N−P, then the circular convolution sum in Eqn. (17) is equivalent to normal convolution, and the filtered audio signal y sounds artifact free. Even if these zero-padding requirements are not fill filled, however, the resulting effects of the time-domain aliasing caused by circular convolution are usually inaudible if a sufficiently tapered analysis and synthesis window are utilized. For example, a sine window for both analysis and synthesis is normally adequate.

An analogous filtering operation may be performed using the STMDCT:

$$Y_{MDCT}[k,t]=H[k,t]X_{MDCT}[k,t] \tag{18}$$

In this case, however, multiplication in the spectral domain is not equivalent to circular convolution in the time domain, and audible artifacts are readily introduced. To understand the origin of these artifacts, it is useful to formulate as a series of matrix multiplications the operations of forward transformation, multiplication with a filter response, inverse transform, and overlap add for both the STDFT and STMDCT. Representing $y_{IDFT}[n,t]$, n=0 . . . N−1, as the N×1 vector $y_{IDFT}^t$ and x[n+Mt], n=0 . . . N−1, as the N×1 vector $x^t$ one can write:

$$y_{IDFT}^t=(W_S A_{DFT}^{-1} H^t A_{DFT} W_A)x^t=T_{DFT}^t x^t \tag{19}$$

where

- $W_A$=N×N matrix with $w_A[n]$ on the diagonal and zeros elsewhere
- $A_{DFT}$=N×N DFT matrix
- $H^t$=N×N matrix with H[k,t] on the diagonal and zeros elsewhere
- $W_S$=N×N matrix with $w_S[n]$ on the diagonal and zeros elsewhere
- $T_{DFT}^t$=N×n matrix encompassing the entire transformation With the hopsize set to M=N/2, the second half and first half of consecutive blocks are added to generate N/2 points of the final signal y. This may be represented through matrix multiplication as:

$$\begin{bmatrix} y[Mt] \\ \vdots \\ y[Mt+N/2-1] \end{bmatrix} = [0 \;\; I \;\; I \;\; 0]\begin{bmatrix} y_{IDFT}^{t-1} \\ y_{IDFT}^t \end{bmatrix} \tag{20a}$$

$$= [0 \;\; I \;\; I \;\; 0]\begin{bmatrix} T_{DFT}^{t-1} & 0 \\ & 0 \\ 0 & \\ 0 & T_{DFT}^t \end{bmatrix}\begin{bmatrix} x[Mt-N/2] \\ \vdots \\ x[Mt+N-1] \end{bmatrix} \tag{20b}$$

$$= V_{DFT}^t\begin{bmatrix} x[Mt-N/2] \\ \vdots \\ x[Mt+N-1] \end{bmatrix} \tag{20c}$$

where

- I=(N/2×N/2) identity matrix
- 0=(N/2×N/2) matrix of zeros
- $V_{DFT}^t$=(N/2)×(3N/2) matrix combining transforms and overlap add An analogous matrix formulation of filter multiplication in the MDCT domain may be expressed as:

$$y_{IMDCT}^t=(W_S A_{SDFT}^{-1} H^t A_{SDFT}(I+D) W_A)x^t=t_{MDCT}^t x^t \tag{21}$$

where

- $A_{SDFT}$=N×N SDFT matrix
- I=N×N identity matrix
- D=N×N time aliasing matrix corresponding to the time aliasing in Eqn. (9)
- $T_{MDCT}^t$=N×N matrix encompassing the entire transformation Note that this expression utilizes an additional relation between the MDCT and the SDFT that may be expressed through the relation:

$$A_{MDCT}=A_{SDFT}(I+D) \tag{22}$$

where D is an N×N matrix with −1's on the off-diagonal in the upper left quadrant and 1's on the off diagonal in the lower left quadrant. This matrix accounts for the time aliasing shown in Eqn. 9. A matrix $V_{MDCT}^t$ incorporating overlap-add may then be defined analogously to $V_{DFT}^t$:

$$V_{MDCT}^t = [0 \;\; I \;\; I \;\; 0]\begin{bmatrix} T_{MDCT}^{t-1} & 0 \\ & 0 \\ 0 & \\ 0 & T_{MDCT}^t \end{bmatrix} \tag{23}$$

Figure 3A:
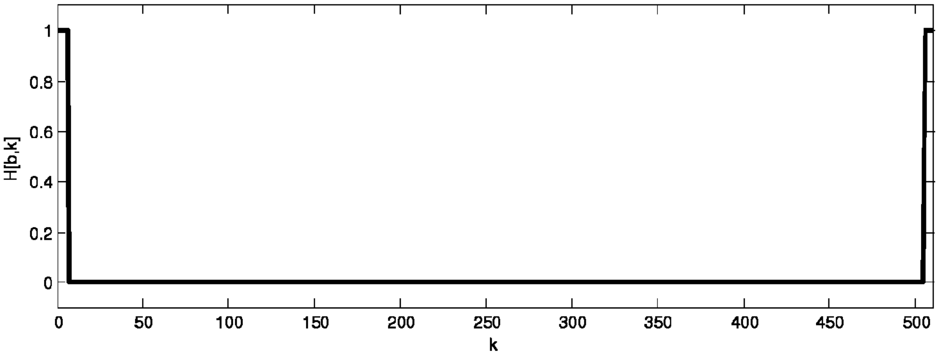
FIG. 3*a* shows a filter response H[k,t], an ideal brick-wall low-pass filter.

One may now examine the matrices $T_{DFT}^t$, $V_{DFT}^t$, $T_{MDCT}^t$, and $V_{MDCT}^t$, for a particular filter H[k,t] in order to understand the artifacts that arise from filtering in the MDCT domain. With N=512, consider a filter H[k, t], constant over blocks t, which takes the form of a brick wall low-pass filter as shown in FIG. 3*a*. The corresponding impulse response, $h_{IDFT}[n,t]$, is shown in FIG. 1*b*.

Figure 4A:
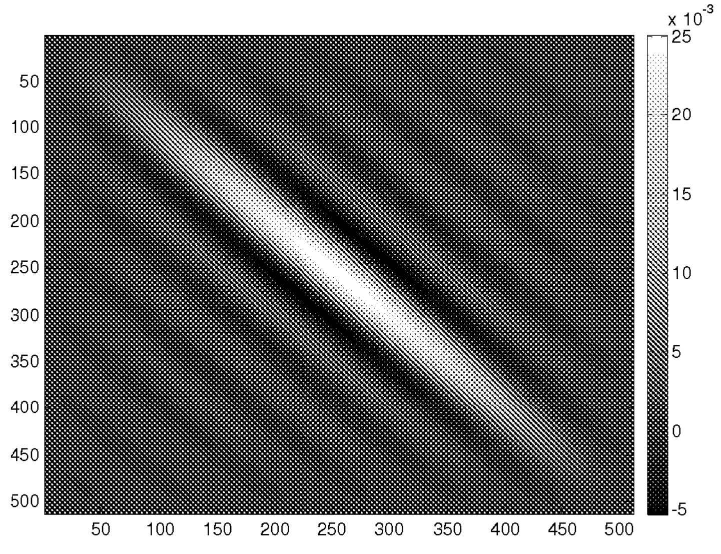
FIG. 4*a* is a gray-scale image of the matrix $T_{DFT}^{t}$ corresponding to the filter response H[k,t] of FIG. 3*a*. In this and other Gray scale images herein, the x and y axes represent the columns and rows of the matrix, respectively, and the intensity of gray represents the value of the matrix at a particular row/column location in accordance with the scale depicted to the right of the image.
Figure 4B:
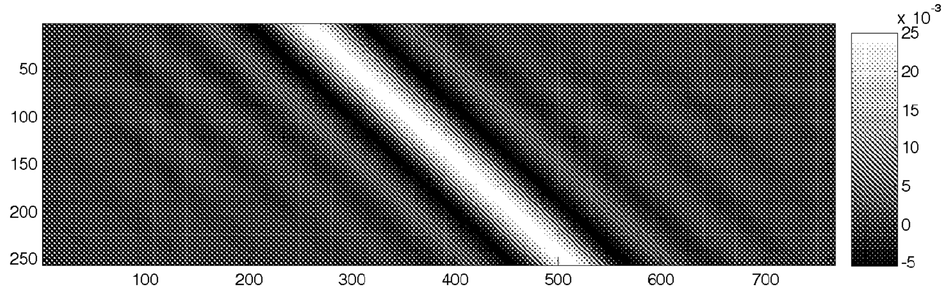
FIG. 4*b* is a gray-scale image of the matrix $V_{DFT}^{t}$ corresponding to the filter response H[k,t] of FIG. 3*a*.

With both the analysis and synthesis windows set as sine windows, FIGS. 4*a* and 4*b* depict gray scale images of the matrices $T_{DFT}^t$ and $V_{DFT}^t$ corresponding to H[k,t] shown in FIG. 1*a*. In these images, the x and y axes represent the columns and rows of the matrix, respectively, and the intensity of gray represents the value of the matrix at a particular row/column location in accordance with the scale depicted to the right of the image. The matrix $V_{DFT}^t$ is formed by overlap adding the lower and upper halves of the matrix $T_{DFT}^t$. Each row of the matrix $V_{DFT}^t$ can be viewed as an impulse response that is convolved with the signal x to produce a single sample of the filtered signal y. Ideally each row should approximately equal $h_{IDFT}[n,t]$ shifted so that it is centered on the matrix diagonal. Visual inspection of FIG. 4*b* indicates that this is the case.

Figure 5A:
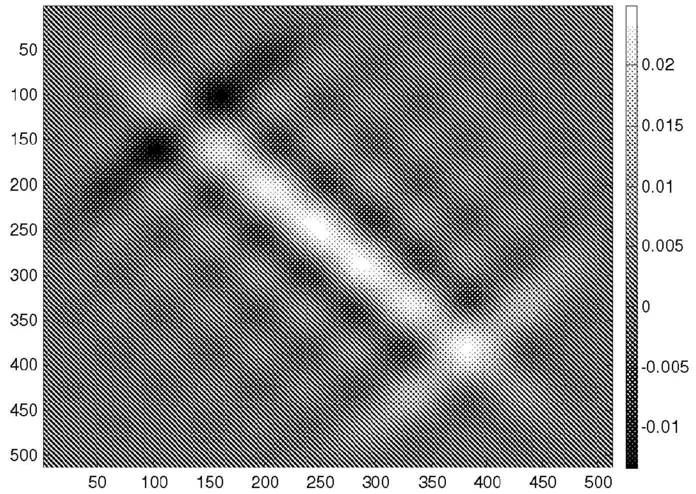
FIG. 5*a* is a gray-scale image of the matrix $T_{MDCT}^{t}$ corresponding to the filter response H[k,t] of FIG. 3*a*.
Figure 5B:
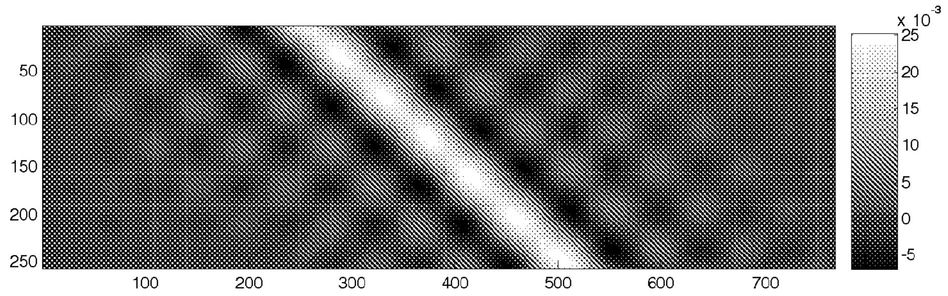
FIG. 5*b* is a gray-scale image of the matrix $V_{MDCT}^{t}$ corresponding to the filter response H[k,t] of FIG. 3*a*.

FIGS. 5*a* and 5*b* depict gray scale images of the matrices $T_{MDCT}^t$ and $V_{MDCT}^t$ for the same filter H[k,t]). One sees in $T_{MDCT}^t$ that the impulse response $h_{IDFT}[n,t]$ is replicated along the main diagonal as well as upper and lower off-diagonals corresponding to the aliasing matrix D in Eqn. (19). As a result, an interference pattern forms from the addition of the response at the main diagonal and those at the aliasing diagonals. When the lower and upper halves of $T_{MDCT}^t$ are added to produce $V_{MDCT}^t$, the main lobes from the aliasing diagonals cancel, but the interference pattern remains. Consequently, the rows of $V_{MDCT}^t$ do not represent the same impulse response replicated along the matrix diagonal. Instead the impulse response varies from sample to sample in a rapidly time-varying manner, imparting audible artifacts to the filtered signal y.

Figure 3B:
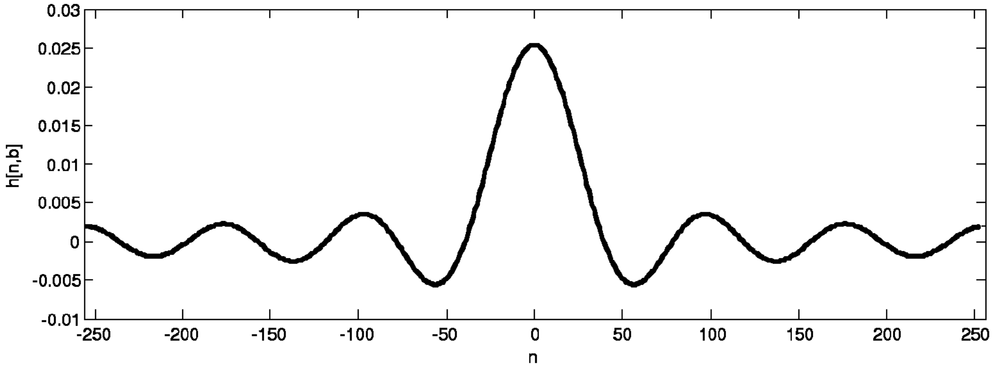
FIG. 3*b* shows an ideal impulse response, $h_{IDFT}[n,t]$.
Figure 6A:
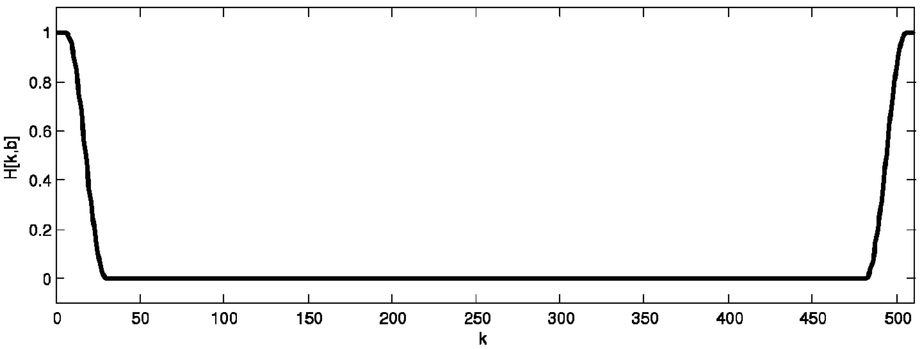
FIG. 6*a* shows the filter response H[k,t] as a smoothed low-pass filter.
Figure 6B:
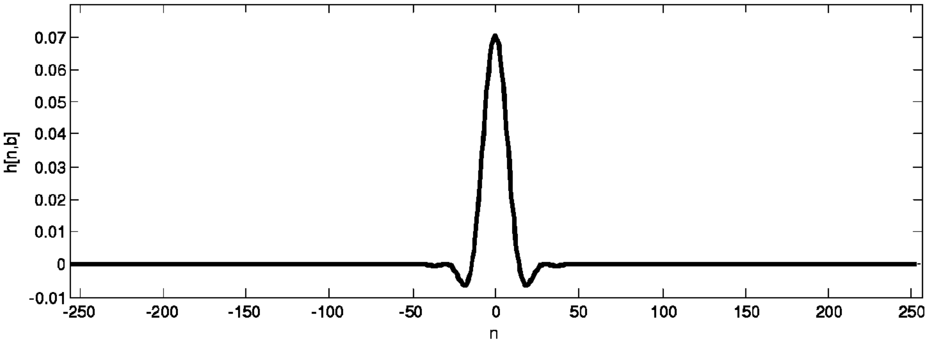
FIG. 6*b* shows the time-compacted impulse response $h_{IDFT}[n,t]$.

Now consider a filter H[k,t] shown in FIG. 6*a*. This is the same low-pass filter from FIG. 1*a* but with the transition band widened considerably. The corresponding impulse response, $h_{IDFT}[n,t]$, is shown in FIG. 6*b*, and one notes that it is considerably more compact in time than the response in FIG. 3*b*. This reflects the general rule that a frequency response that varies more smoothly across frequency will have an impulse response that is more compact in time.

Figure 7A:
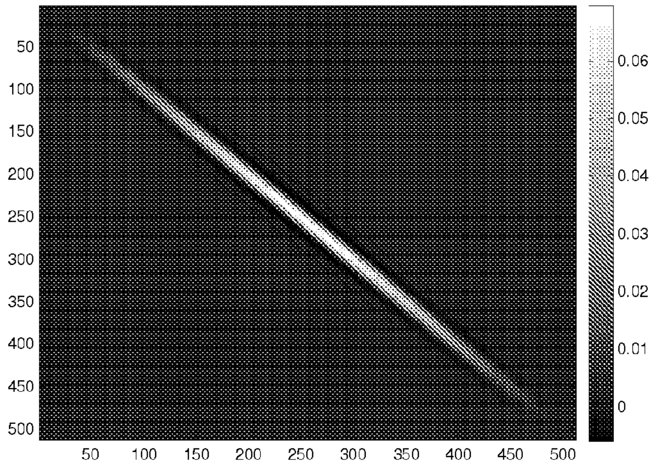
FIG. 7*a* shows a gray-scale image of the matrix $T_{DFT}^{t}$ corresponding to the filter response H[k,t] of FIG. 6*a* Compare to FIG. 4*a*.
Figure 7B:
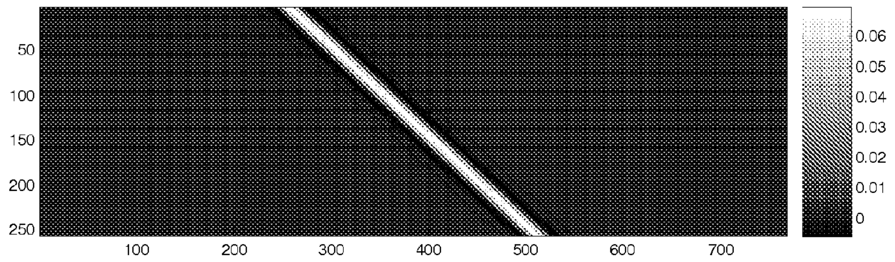
FIG. 7*b* shows a gray-scale image of the matrix $V_{DFT}^{t}$ corresponding to the filter response H[k,t] of FIG. 6*a*. Compare to FIG. 4*b*.

FIGS. 7*a* and 7*b* depict the matrices $T_{DFT}^{t}$ and $V_{DFT}^{t}$ corresponding to this smoother frequency response. These matrices exhibit the same properties as those shown in FIGS. 4*a* and 4*b*.

Figure 8A:
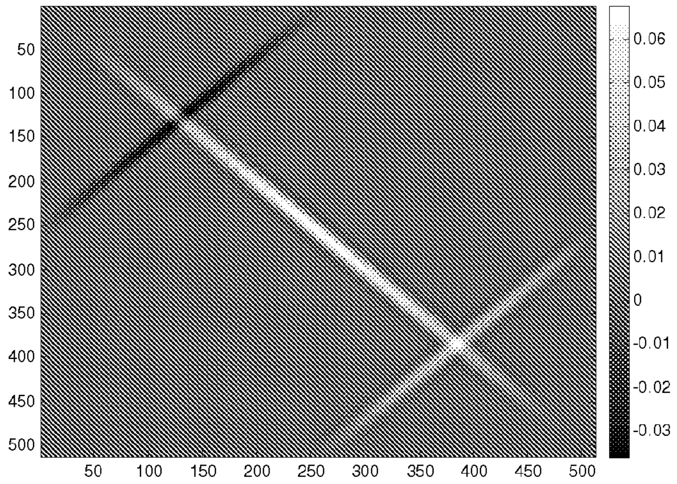
FIG. 8*a* shows a gray-scale image of the matrix $T_{MDCT}^{t}$ corresponding to the filter response H[k,t] of FIG. 6*a*.
Figure 8B:
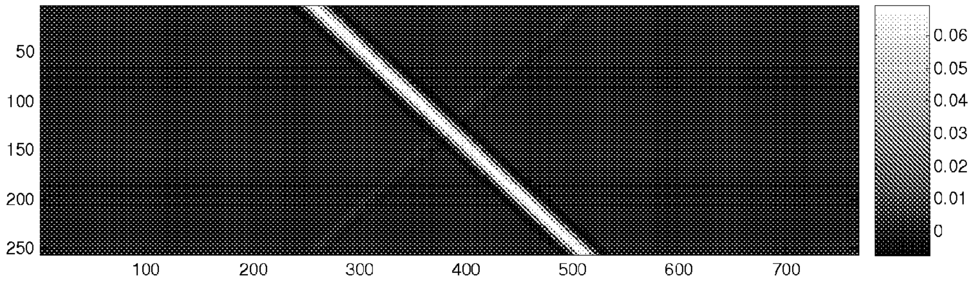
FIG. 8*b* shows a gray-scale image of the matrix $V_{MDCT}^{t}$ corresponding to the filter response H[k,t] of FIG. 6*a*.

FIGS. 8*a* and 8*b* depict the matrices $T_{MDCT}^{t}$ and $V_{MDCT}^{t}$ for the same smooth frequency response. The matrix $T_{MDCT}^{t}$ does not exhibit any interference pattern because the impulse response $h_{IDFT}[n,t]$ is so compact in time. Portions of $h_{IDFT}[n,t]$ significantly larger than zero do not occur at locations distant from the main diagonal or the aliasing diagonals. The matrix $V_{MDCT}^{t}$ is nearly identical to $V_{DFT}^{t}$ except for a slightly less than perfect cancellation of the aliasing diagonals, and as a result the filtered signal y is free of any significantly audible artifacts.

It has been demonstrated that filtering in MDCT domain, in general, may introduce perceptual artifacts. However, the artifacts become negligible if the filter response varies smoothly across frequency. Many audio applications require filters that change abruptly across frequency. Typically, however, these are applications that change the signal for purposes other than a perceptual modification; for example, sample rate conversion may require a brick-wall low-pass filter. Filtering operations for the purpose of making a desired perceptual change generally do not require filters with responses that vary abruptly across frequency. As a result, such filtering operations may be applied in the MDCT domain without the introduction of objectionable perceptual artifacts. In particular, the types of frequency responses utilized for loudness modification are constrained to be smooth across frequency, as will be demonstrated below, and may therefore be advantageously applied in the MDCT domain.

BEST MODE FOR CARRYING OUT THE INVENTION

Aspects of the present invention provide for measurement of the perceived loudness of an audio signal that has been transformed into the MDCT domain. Further aspects of the present invention provide for adjustment of the perceived loudness of an audio signal that exists in the MDCT domain.

Loudness Measurement in the MDCT Domain

As was shown above, properties of the STMDCT make loudness measurement possible and directly using the STMDCT representation of an audio signal. First, the power spectrum estimated from the STMDCT is equal to approximately half of the power spectrum estimated from the STSDFT. Second, filtering of the STMDCT audio signal can be performed provided the impulse response of the filter is compact in time.

Therefore techniques used to measure the loudness of an audio using the STSDFT and STDFT may also be used with the STMDCT based audio signals. Furthermore, because many STDFT methods are frequency-domain equivalents of time-domain methods, it follows that many time-domain methods have frequency-domain STMDCT equivalent methods.

Figure 9:
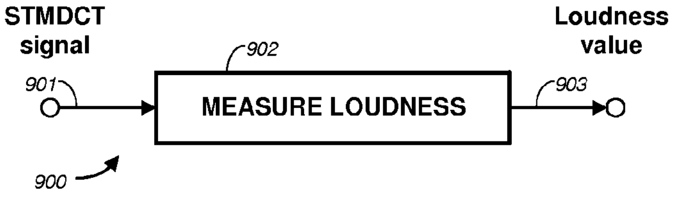
FIG. 9 shows a block diagram of a loudness measurement method according to basic aspects of the present invention.

FIG. 9 shows a block diagram of a loudness measurer or measuring process according to basic aspects of the present invention. An audio signal consisting of successive STMDCT spectrums (901), representing overlapping blocks of time samples, is passed to a loudness-measuring device or process ("Measure Loudness") 902. The output is a loudness value 903.

Measure Loudness 902

Measure Loudness 902 may represent one of any number of loudness measurement devices or processes such as weighted power measures and psychoacoustic-based measures. The following paragraphs describe weighted power measurement.

Figure 10:
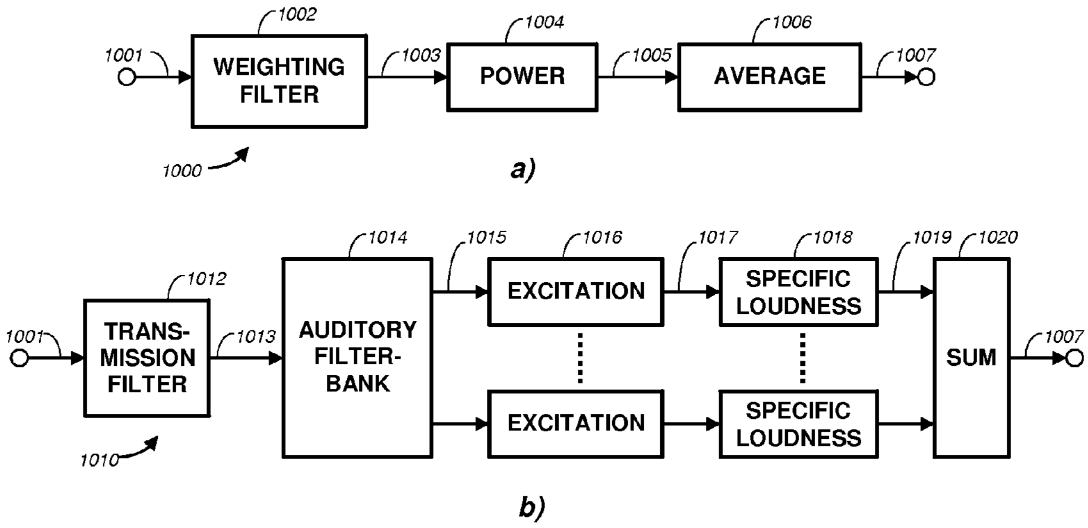
FIG. 10*a* is a schematic functional block diagram of a weighted power measurement device or process.
FIG. 10*b* is a schematic functional block diagram of a psychoacoustic-based measurement device or process.

FIGS. 10*a* and 10*b* show block diagrams of two general techniques for objectively measuring the loudness of an audio signal. These represent different variations on the functionality of the Measure Loudness 902 shown of FIG. 9.

Figure 11:
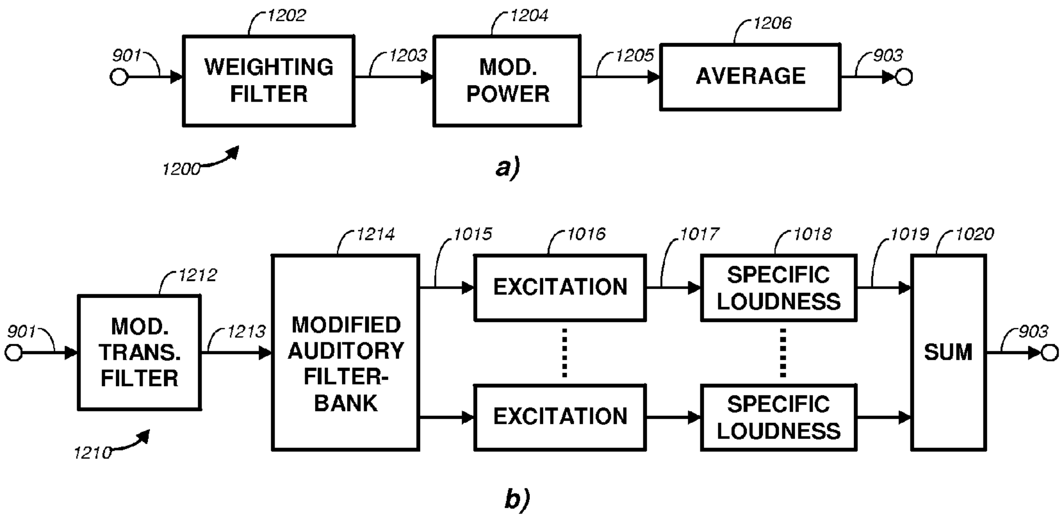
FIG. 11*a* is a schematic functional block diagram of a weighted power measurement device or process according to aspects of the present invention.
FIG. 11*b* is a schematic functional block diagram of a psychoacoustic-based measurement device or process according to aspects of the present invention.

FIG. 10*a* outlines the structure of a weighted power measuring technique commonly used in loudness measuring devices. An audio signal 1001 is passed through a Weighting Filter 1002 that is designed to emphasize more perceptibly sensitive frequencies while deemphasizing less perceptibly sensitive frequencies. The power 1005 of the filtered signal 1003 is calculated (by Power 1004) and averaged (by Average 1006) over a defined time period to create a single loudness value 1007. A number of different standard weighting filters exist and are shown in FIG. 11. In practice, modified versions of this process are often used, for example, preventing time periods of silence from being included in the average.

Psychoacoustic-based techniques are often also used to measure loudness. FIG. 10*b* shows a generalized block diagram of such techniques. An audio signal 1001 is filtered by Transmission Filter 1012 that represents the frequency varying magnitude response of the outer and middle ear. The filtered signal 1013 is then separated into frequency bands (by Auditory Filter Bank 1014) that are equivalent to, or narrower than, auditory critical bands. Each band is then converted (by Excitation 1016) into an excitation signal 1017 representing the amount of stimuli or excitation experienced by the human ear within the band. The perceived loudness or specific loudness for each band is then calculated (by Specific Loudness 1018) from the excitation and the specific loudness across all bands is summed (by Sum 1020) to create a single measure of loudness 1007. The summing process may take into consideration various perceptual effects, for example, frequency masking. In practical implementations of these perceptual methods, significant computational resources are required for the transmission filter and auditory filterbank.

In accordance with aspects of the present invention, such general methods are modified to measure the loudness of signals already in the STMDCT domain.

Figure 12:
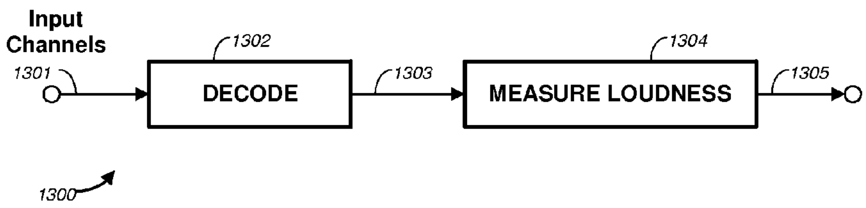
FIG. 12 is a schematic functional block diagram showing an aspect of the present invention for measuring the loudness of audio encoded in the MDCT domain, for example low-bitrate code audio.

In accordance with aspects of the present invention, FIG. 12*a* shows an example of a modified version of the Measure Loudness device or process of FIG. 10*a*. In this example, the weighting filter may be applied in the frequency domain by increasing or decreasing the STMDCT values in each band. The power of the frequency weighted STMDCT may then calculated in 1204, taking into account the fact that the power of the STMDCT signal is approximately half that of the equivalent time domain or STDFT signal. The power signal 1205 may then averaged across time and the output may be taken as the objective loudness value 903.

In accordance with aspects of the present invention, FIG. 12*b* shows an example of a modified version of the Measure Loudness device or process of FIG. 10*b*. In this example, the Modified Transmission Filter 1212 is applied directly in the frequency domain by increasing or decreasing the STMDCT values in each band. The Modified Auditory Filterbank 1214 accepts as an input the linear frequency band spaced STMDCT spectrum and splits or combines these bands into the critical band spaced filterbank output 1015. The Modified Auditory Filterbank also takes into account the fact that the power of the STMDCT signal is approximately half that of the equivalent time domain or STDFT signal. Each band is then converted (by Excitation 1016) into an excitation signal 1017 representing the amount of stimuli or excitation experienced by the human ear within the band. The perceived loudness or specific loudness for each band is then calculated (by Specific Loudness 1018) from the excitation 1017 and the specific loudness across all bands is summed (by Sum 1020) to create a single measure of loudness 903.

Implementation Details for Weighted Power Loudness Measurement

As described previously, $X_{MDCT}[k,t]$ representing the STMDCT is an audio signal x where k is the bin index and t is the block index. To calculate the weighted power measure, the STMDCT values first are gain adjusted or weighted using the appropriate weighting curve (A, B, C) such as shown in FIG. 11. Using A weighting as an example, the discrete A-weighting frequency values, $A_W[k]$, are created by computing the A-weighting gain values for the discrete frequencies, $f_{discrete}$, where $$f_{discrete} = \frac{F}{2} + F \cdot k \quad 0 \leq k < N \tag{24a}$$

where $$F = \frac{F_s}{2 \cdot N} \quad 0 \leq k < N \tag{24b}$$

and where $F_S$ is the sampling frequency in samples per second.

The weighted power for each STMDCT block t is calculated as the sum across frequency bins k of the square of the multiplication of the weighting value and twice the STMDCT power spectrum estimate given in either Eqn. 13a or Eqn. 14c.

$$P^A[t] = \sum_{k=0}^{\frac{N}{2}-1} A_W^2[k] 2P_{MDCT}[k, t] \tag{25}$$

The weighted power is then converted to units of dB as follows:

$$L^A[t] = 10 \cdot \log_{10}(P^A[t]) \tag{26}$$

Similarly, B and C weighted as well as unweighted calculations may be performed. In the unweighted case, the weighting values are set to 1.0.

Implementation Details for Psychoacoustic Loudness Measurement

Psychoacoustically-based loudness measurements may also be used to measure the loudness of an STMDCT audio signal.

Said WO 2004/111994 A2 application of Seefeldt et al discloses, among other things, an objective measure of perceived loudness based on a psychoacoustic model. The power spectrum values, $P_{MDCT}[k,t]$, derived from the STMDCT coefficients 901 using Eqn. 13a or 14c, may serve as inputs to the disclosed device or process, as well as other similar psychoacoustic measures, rather than the original PCM audio. Such a system is shown in the example of FIG. 10*b*.

Borrowing terminology and notation from said PCT application, an excitation signal E[b,t] approximating the distribution of energy along the basilar membrane of the inner ear at critical band b during time block t may be approximated from the STMDCT power spectrum values as follows:

$$E[b, t] = \sum_k |T[k]|^2 |C_b[k]|^2 2P_{MDCT}[k, t]^2 \tag{27}$$

where T[k] represents the frequency response of the transmission filter and $C_b[k]$ represents the frequency response of the basilar membrane at a location corresponding to critical band b, both responses being sampled at the frequency corresponding to transform bin k. The filters $C_b[k]$ may take the form of those depicted in FIG. 1.

Using equal loudness contours, the excitation at each band is transformed into an excitation level that would generate the same loudness at 1 kHz. Specific loudness, a measure of perceptual loudness distributed across frequency and time, is then computed from the transformed excitation, $E_{1\,kHz}[b,t]$, through a compressive non-linearity:

$$N[b, t] = G\left(\left(\frac{E_{1kHz}[b]}{TQ_{1kHz}}\right)^{\alpha} - 1\right) \tag{28}$$

where $TQ_{1\,kHz}$ is the threshold in quiet at 1 kHz and the constants G and a are chosen to match data generated from psychoacoustic experiments describing the growth of loudness. Finally, the total loudness, L, represented in units of sone, is computed by summing the specific loudness across bands:

$$L[t] = \sum_b N[b, t] \tag{29}$$

For the purposes of adjusting the audio signal, one may wish to compute a matching gain, $G_{Match}[t]$, which when multiplied with the audio signal makes the loudness of the adjusted audio equal to some reference loudness, $L_{REF}$, as measured by the described psychoacoustic technique. Because the psychoacoustic measure involves a non-linearity in the computation of specific loudness, a closed form solution for $G_{Match}[t]$ does not exist. Instead, an iterative technique described in said PCT application may be employed in which the square of the matching gain is adjusted and multiplied by the total excitation, E[b,t], until the corresponding total loudness, L, is within some tolerance of the reference loudness, $L_{REF}$. The loudness of the audio may then be expressed in dB with respect to the reference as:

$$L_{dB}[t] = 20\log_{10}\left(\frac{1}{G_{Match}[t]}\right) \tag{30}$$

Applications of STMDCT Based Loudness Measurement

One of the main virtues of the present invention is that it permits the measurement and modification of the loudness of low-bit rate coded audio (represented in the MDCT domain) without the need to fully decode the audio to PCM. The decoding process includes the expensive processing steps of bit allocation, inverse transform, etc. By avoiding some of the decoding steps the processing requirements, computational overhead is reduced. This approach is beneficial when a loudness measurement is desired but decoded audio is not needed. Applications include loudness verification and modification tools such as those outlined in United States Patent Application 2006/0002572 A1, of Smithers et al., published Jan. 5, 2006, entitled "Method for correcting metadata affecting the playback loudness and dynamic range of audio information," where, often times, the loudness measurement and correction are performed in the broadcast storage or transmission chain where access to the decoded audio is not needed. The processing savings provided by this invention also help make it possible to perform loudness measurement and metadata correction (for example, changing a Dolby Digital DIALNORM metadata parameter to the correct value) on a large number of low-bitrate compressed audio signals that are being transmitted in real-time. Often, many low-bitrate coded audio signals are multiplexed and transported in MPEG transport streams. The existence of efficient loudness measurement techniques allows loudness measurement on a large number of compressed audio signals when compared to the requirements of fully decoding the compressed audio signals to PCM to perform the loudness measurement.

Figure 13:
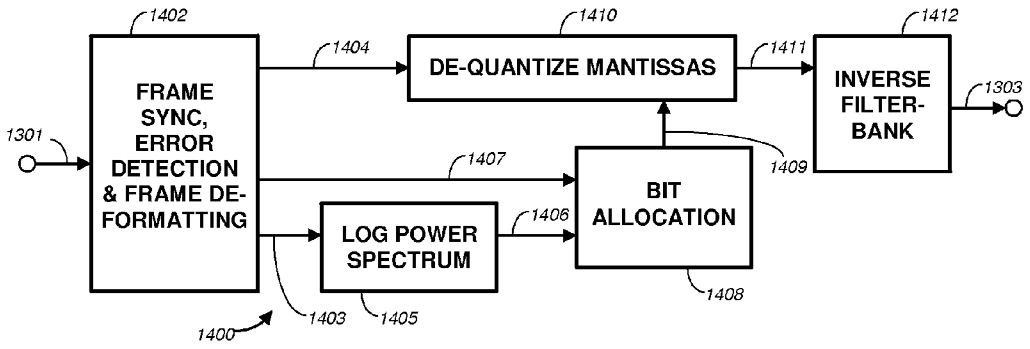
FIG. 13 is a schematic functional block diagram showing an example of a decoding process usable in the arrangement of FIG. 12.

FIG. 13 shows a way of measuring loudness without employing aspects of the present invention. A full decode of the audio (to PCM) is performed and the loudness of the audio is measured using known techniques. More specifically, low-bitrate coded audio data or information 1301 is first decoded by a decoding device or process ("Decode") 1302 into an uncompressed audio signal 1303. This signal is then passed to a loudness-measuring device or process ("Measure Loudness") 1304 and the resulting loudness value is output as 1305.

Figure 14:
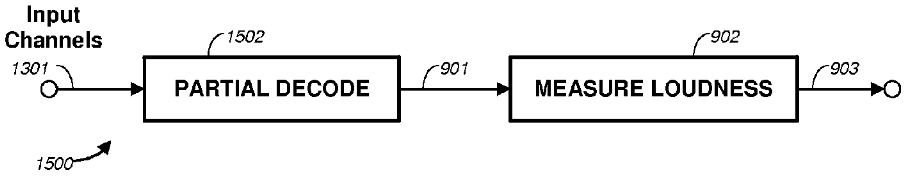
FIG. 14 is a schematic functional block diagram showing an aspect of the present invention in which STMDCT coefficients obtained from partial decoding in a low-bit rate audio coder are used in loudness measurement.

FIG. 14 shows an example of a Decode process 1302 for a low-bitrate coded audio signal. Specifically, it shows the structure common to both a Dolby Digital decoder and a Dolby E decoder. Frames of coded audio data 1301 are unpacked into exponent data 1403, mantissa data 1404 and other miscellaneous bit allocation information 1407 by device or process 1402. The exponent data 1403 is converted into a log power spectrum 1406 by device or process 1405 and this log power spectrum is used by the Bit Allocation device or process 1408 to calculate signal 1409, which is the length, in bits, of each quantized mantissa. The mantissas 1411 are then unpacked or de-quantized in device or process 1410 and combined with the exponents 1409 and converted back to the time domain by the Inverse Filterbank device or process 1412. The Inverse Filterbank also overlaps and sums a portion of the current Inverse Filterbank result with the previous Inverse Filterbank result (in time) to create the decoded audio signal 1303. In practical decoder implementations, significant computing resources are required to perform the Bit Allocation, De-Quantize Mantissas and Inverse Filterbank processes. More details on the decoding process can be found in the A/52A document cited above.

Figure 15:
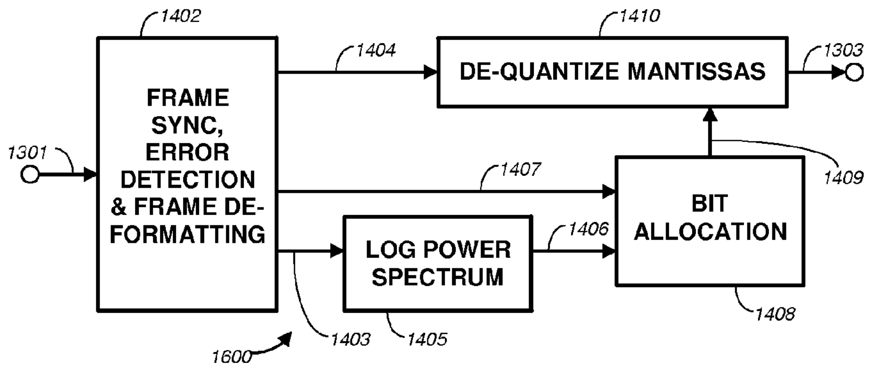
FIG. 15 is a schematic functional block diagram showing an example of using STMDCT coefficients obtained from a partial decoding in a low-bit rate audio coder for use in loudness measurement.

FIG. 15 shows a simple block diagram of aspects of the present invention. In this example, a coded audio signal 1301 is partially decoded in device or process 1502 to retrieve the MDCT coefficients and the loudness is measured in device or process 902 using the partially decoded information. Depending on how the partial decoding is performed, the resulting loudness measure 903 may be very similar to, but not exactly the same as, the loudness measure 1305 calculated from the completely decoded audio signal 1303. However, this measure may be close enough to provide a useful estimate of the loudness of the audio signal.

Figure 16:
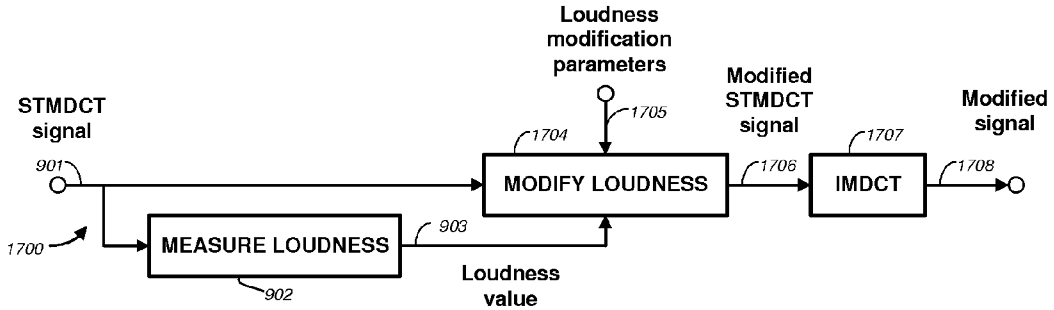
FIG. 16 is a schematic functional block diagram showing an example of an aspect of the invention in which the loudness of the audio is modified by altering its STMDCT representation based on a measurement of loudness obtained from the same representation.

FIG. 16 shows an example of a Partial decode device or process embodying aspects of the present invention and as shown in example of FIG. 15. In this example, no inverse STMDCT is performed and the STMDCT signal 1303 is output for use in the Measure Loudness device or process.

In accordance with aspects of the present invention, partial decoding in the STMDCT domain results in significant computational savings because the decoding does not require a filterbank processes.

Perceptual coders are often designed to alter the length of the overlapping time segments, also called the block size, in conjunction with certain characteristics of the audio signal. For example Dolby Digital uses two block sizes; a longer block of 512 samples predominantly for stationary audio signals and a shorter block of 256 samples for more transient audio signals. The result is that the number of frequency bands and corresponding number of STMDCT values varies block by block. When the block size is 512 samples, there are 256 bands and when the block size is 256 samples, there are 128 bands.

There are many ways that the examples of FIGS. 13 and 14 can handle varying block sizes and each way leads to a similar resulting loudness measure. For example, the De-Quantize Mantissas process 805 may be modified to always output a constant number of bands at a constant block rate by combining or averaging multiple smaller blocks into larger blocks and spreading the power from the smaller number of bands across the larger number of bands. Alternatively, the Measure Loudness methods could accept varying block sizes and adjust their filtering, Excitation, Specific Loudness, Averaging and Summing processes accordingly, for example by adjusting time constants.

An alternative version of the present invention for measuring the loudness of Dolby Digital and Dolby E streams may be more efficient but slightly less accurate. According to this alternative, the Bit Allocation and De-Quantize Mantissas are not performed and only the STMDCT Exponent data 1403 is used to recreate the MDCT values. The exponents can be read from the bit stream and the resulting frequency spectrum can be passed to the loudness measurement device or process. This avoids the computational cost of the Bit Allocation, Mantissa De-Quantization and Inverse Transform but has the disadvantage of a slightly less accurate loudness measurement when compared to using the full STMDCT values.

Experiments performed using standard loudness audio test material have shown that the psychoacoustic loudness values computed using only the partially decoded STMDCT data are very close to the values computed using the same psychoacoustic measure with the original PCM audio data. For a test set of 32 audio test pieces, the average absolute difference between $L_{dB}$ computed using PCM and quantized Dolby Digital exponents was only 0.093 dB with a maximum absolute difference of 0.54 dB. These values are well within the range of practical loudness measurement accuracy.

Other Perceptual Audio Codecs

Audio signals coded using MPEG2-AAC can also be partially decoded to the STMDCT coefficients and the results passed to an objective loudness measurement device or process. MPEG2-AAC coded audio primarily consists of scale factors and quantized transform coefficients. The scale factors are unpacked first and used to unpack the quantized transform coefficients. Because neither the scale factors nor the quantized transform coefficients themselves contain enough information to infer a coarse representation of the audio signal, both must be unpacked and combined and the resulting spectrum passed to a loudness measurement device or process. Similarly to Dolby Digital and Dolby E, this saves the computational cost of the inverse filterbank.

Essentially, for any coding system where partially decoded information can produce the STMDCT or an approximation to the STMDCT of the audio signal, the aspect of the invention shown in FIG. 15 can lead to significant computational savings.

Loudness Modification in the MDCT Domain

Figure 17A:
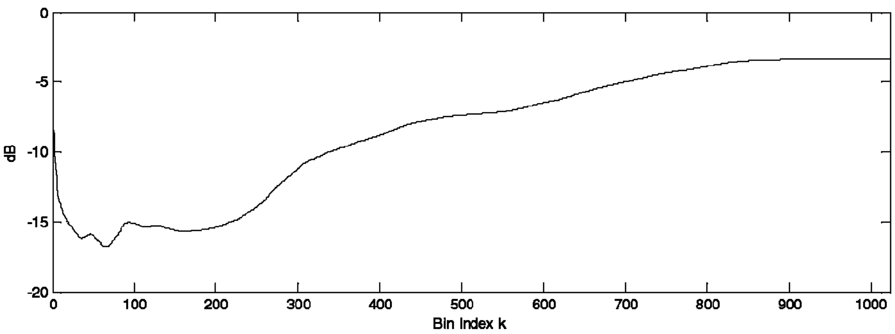
FIG. 17*a* shows a filter response Filter H[k,t] corresponding to a fixed scaling of specific loudness.
Figure 17B:
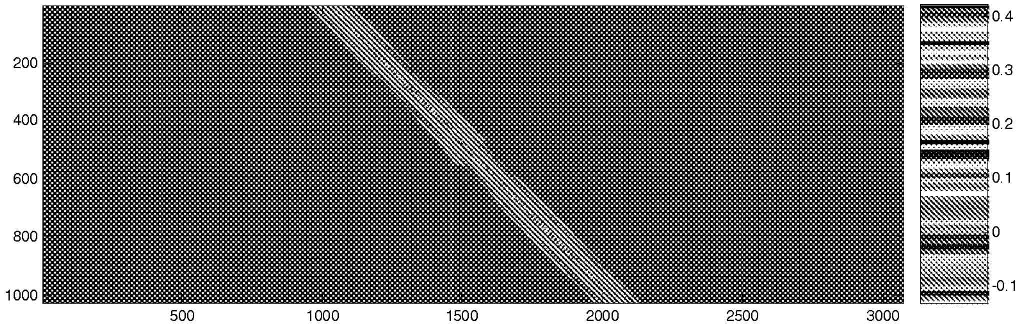
FIG. 17*b* shows a gray-scale image of the matrix corresponding to a filter having the response shown in FIG. 17*a*.

A further aspect of the invention is to modify the loudness of the audio by altering its STMDCT representation based on a measurement of loudness obtained from the same representation. FIG. 17 depicts an example of a modification device or process. As in the FIG. 9 example, an audio signal consisting of successive STMDCT blocks (901) is passed to the Measure Loudness device or process 902 from which a loudness value 903 is produced. This loudness value along with the STMDCT signal are input to a Modify Loudness device or process 1704, which may utilize the loudness value to change the loudness of the signal. The manner in which the loudness is modified may be alternatively or additionally controlled by loudness modification parameters 1705 input from an external source, such as an operator of the system. The output of the Modify Loudness device or process is a modified STMDCT signal 1706 that contains the desired loudness modifications. Lastly, the modified STMDCT signal may be further processed by an Inverse MDCT device or function 1707 that synthesizes the time domain modified signal 1708 by performing an IMDCT on each block of the modified STMDCT signal and then overlap-adding successive blocks.

One specific embodiment of the FIG. 17 example is an automatic gain control (AGC) driven by a weighted power measurement, such as the A-weighting. In such a case, the loudness value 903 may be computed as the A-weighted power measurement given in Eqn. 25. A reference power measurement $P_{ref}^{A}$, representing the desired loudness of the audio signal, may be provided through the loudness modification parameters 1705. From the time-varying power measurement $P^{A}[t]$ and the reference power $P_{ref}^{A}$, one may then compute a modification gain $$G[t] = \sqrt{\frac{P_{ref}^{A}}{P^{A}[t]}} \tag{31}$$

that is multiplied with the STMDCT signal $X_{MDCT}[k,t]$ to produce the modified STMDCT signal $\hat{X}_{MDCT}[k,t]$:

$$\hat{X}_{MDCT}[k,t]=G[t]X_{MDCT}[k,t] \tag{32}$$

In this case, the modified STMDCT signal corresponds to an audio signal whose average loudness is approximately equal to the desired reference $P_{ref}^{A}$. Because the gain G[t] varies from block-to-block, the time domain aliasing of the MDCT transform, as specified in Eqn. 9, will not cancel perfectly when the time domain signal 1708 is synthesized from the modified STMDCT signal of Eqn. 33. However, if the smoothing time constant used for computing the power spectrum estimate from the STMDCT is large enough, the gain G[t] will vary slowly enough so that this aliasing cancellation error is small and inaudible. Note that in this case the modifying gain G[t] is constant across all frequency bins k, and therefore the problems described earlier in connection with filtering in the MDCT domain are not an issue.

In addition to AGC, other loudness modification techniques may be implemented in a similar manner using weighted power measurements. For example, Dynamic Range Control (DRC) may be implemented by computing a gain G[t] as a function of $P^{A}[t]$ so that the loudness of the audio signal is increased when $P^{A}[t]$ is small and decreased when $P^{A}[t]$ is large, thus reducing the dynamic range of the audio. For such a DRC application, the time constant used for computed the power spectrum estimate would typically be chosen smaller than in the AGC application so that the gain G[t] reacts to shorter-term variations in the loudness of the audio signal.

One may refer to the modifying gain G[t], as shown in Eqn. 32, as a wideband gain because it is constant across all frequency bins k. The use of a wideband gain to alter the loudness of an audio signal may introduce several perceptually objectionable artifacts. Most recognized is the problem of cross-spectral pumping, where variations in the loudness of one portion of the spectrum may audibly modulate other unrelated portions of the spectrum. For example, a classical music selection might contain high frequencies dominated by a sustained string note, while the low frequencies contain a loud, booming timpani. In the case of DRC described above, whenever the timpani hits, the overall loudness increases, and the DRC system applies attenuation to the entire spectrum. As a result, the strings are heard to "pump" down and up in loudness with the timpani. A typical solution involves applying a different gain to different portions of the spectrum, and such a solution may be adapted to the STMDCT modification system disclosed here. For example, a set of weighted power measurements may be computed, each from a different region of the power spectrum (in this case a subset of the frequency bins k), and each power measurement may then be used to compute a loudness modification gain that is subsequently multiplied with the corresponding portion of the spectrum. Such "multiband" dynamics processors typically employ 4 or 5 spectral bands. In this case, the gain does vary across frequency, and care must be taken to smooth the gain across bins k before multiplication with the STMDCT in order to avoid the introduction of artifacts, as described earlier.

Another less recognized problem associated with the use of a wideband gain for dynamically altering the loudness of an audio signal is a resulting shift in the perceived spectral balance, or timbre, of the audio as the gain changes. This perceived shift in timbre is a byproduct of variations in human loudness perception across frequency. In particular, equal loudness contours show us that humans are less sensitive to lower and higher frequencies in comparison to midrange frequencies, and this variation in loudness perception changes with signal level; in general, the variations in perceived loudness across frequency for a fixed signal level become more pronounced as signal level decreases. Therefore, when a wideband gain is used to alter the loudness of an audio signal, the relative loudness between frequencies changes, and this shift in timbre may be perceived as unnatural or annoying, especially if the gain changes significantly.

In said International Publication Number WO 2006/047600, a perceptual loudness model described earlier is used both to measure and to modify the loudness of an audio signal. For applications such as AGC and DRC, which dynamically modify the loudness of the audio as a function of its measured loudness, the aforementioned timbre shift problem is solved by preserving the perceived spectral balance of the audio as loudness is changed. This is accomplished by explicitly measuring and modifying the perceived loudness spectrum, or specific loudness, as shown in Eqn. 28. In addition, the system is inherently multiband and is therefore easily configured to address the cross-spectral pumping artifacts associated with wideband gain modification. The system may be configured to perform AGC and DRC as well as other loudness modification applications such as loudness compensated volume control, dynamic equalization, and noise compensation, the details of which may be found in said patent application.

As disclosed in said International Publication Number WO 2006/047600, various aspects of the invention described therein may advantageously employ an STDFT both to measure and modify the loudness of an audio signal. The application also demonstrates that the perceptual loudness measurement associated with this system may also be implemented using a STMDCT, and it will now be shown that the same STMDCT may be used to apply the associated loudness modification. Eqn. 28 show one way in which the specific loudness, N[b,t], may be computed from the excitation, E[b,t]. One may refer generically to this function as $\Psi\{\cdot\}$, such that $$N[b,t]=\Psi\{E[b,t]\} \qquad (33)$$

The specific loudness N[b,t] serves as the loudness value 903 in FIG. 17 and is then fed into the Modify Loudness Process 1704. Based on loudness modification parameters appropriate to the desired loudness modification application, a desired target specific loudness $\hat{N}[b,t]$ is computed as a function $F\{\cdot\}$ of the specific loudness N[b,t]:

$$\hat{N}[b,t]=F\{N[b,t]\} \qquad (34)$$

Next, the system solves for gains G[b,t], which when applied to the excitation, result in a specific loudness equal to the desired target. In others words, gains are found that satisfy the relationship:

$$\hat{N}[b,t]=\Psi\{G^2[b,t]E[b,t]\} \qquad (35)$$

Several techniques are described in said patent application for finding these gains. Finally, the gains G[b,t] are used to modify the STMDCT such that the difference between the specific loudness measured from this modified STMDCT and the desired target $\hat{N}[b,t]$ is reduced. Ideally, the absolute value of the difference is reduced to zero. This may be achieved by computing the modified STMDCT as follows:

$$\hat{X}_{MDCT}[k,t]=\sum_b G[b,t]S_b[k]X_{MDCT}[k,t] \qquad (36)$$

where $S_b[k]$ is a synthesis filter response associated with band b and may be set equal to the basilar membrane filter $C_b[k]$ in Eqn. 27. Eqn. 36 may be interpreted as multiplying the original STMDCT by a time-varying filter response H[k,t] where $$H[k,t]=\sum_b G[b,t]S_b[k] \qquad (37)$$

It was demonstrated earlier that artifacts may be introduced when applying a general filter H[k, t] to the STMDCT as opposed to the STDFT. However, these artifacts become perceptually negligible if the filter H[k,t] varies smoothly across frequency. With the synthesis filters $S_b[k]$ chosen to be equal to the basilar membrane filter responses $C_b[k]$ and the spacing between bands b chosen to be fine enough, this smoothness constraint may be assured. Referring back to FIG. 1, which shows a plot of the synthesis filter responses used in a preferred embodiment incorporating 40 bands, one notes that the shape of each filter varies smoothly across frequency and that there is a high degree of overlap between adjacent filters. As a result, the filter response H[k,t], which is a linear sum of all the synthesis filters $S_b[k]$, is constrained to vary smoothly across frequency. In addition, the gains G[b,t] generated from most practical loudness modification applications do not vary drastically from band-to-band, providing an even stronger assurance of the smoothness of H[k,t].

Figure 18A:
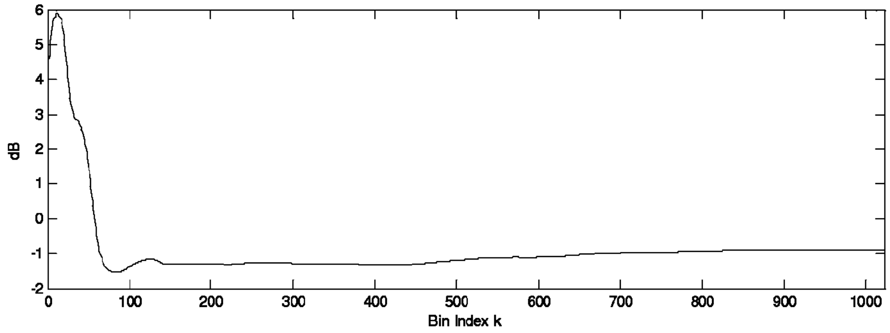
FIG. 18*a* shows a filter response H[k,t] corresponding to a DRC applied to specific loudness.
Figure 18B:
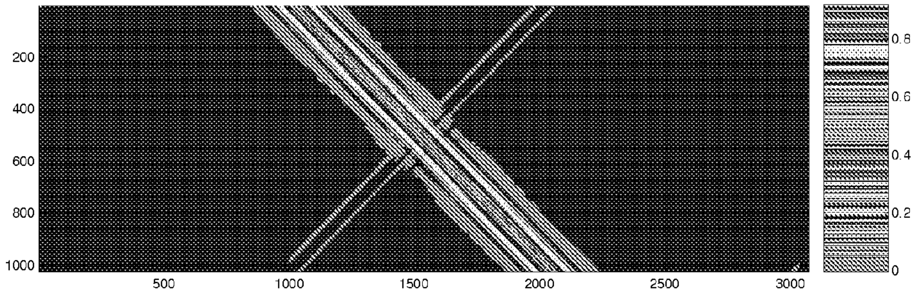
FIG. 18*b* shows a gray-scale image of the matrix $V_{MDCT}^{t}$ corresponding to a filter having the response shown in FIG. 17*a*.

FIG. 18*a* depicts a filter response H[k,t] corresponding to a loudness modification in which the target specific loudness $\hat{N}[b,t]$ was computed simply by scaling the original specific loudness N[b,t] by a constant factor of 0.33. One notes that the response varies smoothly across frequency. FIG. 18*b* shows a gray scale image of the matrix $V_{MDCT}^t$ corresponding to this filter. Note that the gray scale map, shown to the right of the image, has been randomized to highlight any small differences between elements in the matrix. The matrix closely approximates the desired structure of a single impulse response replicated along the main diagonal.

FIG. 19*a* depicts a filter response H[k,t] corresponding to a loudness modification in which the target specific loudness $\hat{N}[b,t]$ was computed by applying multiband DRC to the original specific loudness N[b,t]. Again, the response varies smoothly across frequency. FIG. 19*b* shows a gray scale image of the corresponding matrix $V_{MDCT}^t$, again with a randomized gray scale map. The matrix exhibits the desired diagonal structure with the exception of a slightly imperfect cancellation of the aliasing diagonal. This error, however, is not perceptible.

Implementation

The invention may be implemented in hardware or software, or a combination of both (e.g., programmable logic arrays). Unless otherwise specified, algorithms and processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described herein may be order independent, and thus can be performed in an order different from that described.

The invention claimed is:

1. A method for processing an audio signal represented by the Modified Discrete Cosine Transform (MDCT) of a time-sampled real signal, comprising measuring in the MDCT domain the perceived loudness of the MDCT-transformed audio signal, wherein said measuring includes computing an estimate of the power spectrum of the MDCT-transformed audio signal, wherein said computing an estimate employs weighting to compensate for the MDCT's representation of only one of the quadrature components of the transformed audio signal and smoothing time constants commensurate with the integration time of human loudness perception or slower, and modifying in the MDCT domain, at least in part in response to said measuring, the perceived loudness of the transformed audio signal, wherein said modifying includes gain modifying frequency bands of the MDCT-transformed audio signal, the rate of change of the gain across frequency being constrained by a smoothing function that limits the degree of aliasing distortion.

2. A method according to claim 1 wherein gain modifying frequency bands of the MDCT-transformed audio signal preserves the perceived spectral balance of the audio signal as perceived loudness is modified.

3. A method according to claim 1 or claim 2 wherein said gain modifying comprises filtering frequency bands of the transformed audio signal.

4. A method according to claim 3 wherein the variation or variations in gain from frequency band to frequency band is smooth in the sense of the smoothness of the responses of critical band filters.

5. A method according to claim 1 or claim 2 wherein said gain modifying is also a function of a reference power.

6. Apparatus comprising means adapted to perform all steps of the method of claim 1 or claim 2.

7. A computer program, stored on a computer-readable non-transitory medium for causing a computer to perform the method of claim 1 or claim 2.

* * * * *